(12) United States Patent
Latotzki

(10) Patent No.: US 11,104,327 B2
(45) Date of Patent: *Aug. 31, 2021

(54) METHOD FOR AUTOMATED PARKING OF A VEHICLE

(71) Applicant: MAGNA ELECTRONICS INC., Auburn Hills, MI (US)

(72) Inventor: Ralph Latotzki, Hamburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 136 days.

This patent is subject to a terminal disclaimer.

(21) Appl. No.: 16/283,978

(22) Filed: Feb. 25, 2019

(65) Prior Publication Data

US 2019/0184982 A1 Jun. 20, 2019

Related U.S. Application Data

(63) Continuation of application No. 15/206,801, filed on Jul. 11, 2016, now Pat. No. 10,214,206.

(60) Provisional application No. 62/191,683, filed on Jul. 13, 2015.

(51) Int. Cl.
*B60W 30/06* (2006.01)
*B62D 15/02* (2006.01)

(52) U.S. Cl.
CPC ........... *B60W 30/06* (2013.01); *B62D 15/027* (2013.01); *B62D 15/0285* (2013.01); *B60W 2420/42* (2013.01); *B60W 2420/52* (2013.01); *B60W 2554/00* (2020.02); *B60W 2720/106* (2013.01); *B60W 2720/125* (2013.01); *B60W 2720/24* (2013.01)

(58) Field of Classification Search
CPC ......... B60W 2420/42; B60W 2420/52; B60W 2554/00; B60W 2720/106; B60W 2720/125; B60W 2720/24; B60W 30/06; B62D 15/027; B62D 15/0285
See application file for complete search history.

(56) References Cited

U.S. PATENT DOCUMENTS

| | | |
|---|---|---|
| 5,355,118 A | 10/1994 | Fukuhara |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |

(Continued)

*Primary Examiner* — Behrang Badii
*Assistant Examiner* — Daniel L Greene
(74) *Attorney, Agent, or Firm* — Honigman LLP

(57) ABSTRACT

A method for automated parking of a vehicle includes providing image data captured by at least one vision sensor of the vehicle to an electronic control unit (ECU), and providing a parking scene map to the ECU. A free parking space present in the parking scene map is selected as a target parking space, and a parking path from a current vehicle location to the target parking space is formulated. The vehicle is autonomously maneuvered along the parking path towards the target parking space. Responsive to detection of a pedestrian in the target parking space or along the parking path, the vehicle is stopped until the detected pedestrian moves out of the target parking space or out of the parking path. After the detected pedestrian has moved out of the target parking space or out of the parking path, the vehicle continues autonomous maneuvering along the parking path towards the target parking space.

41 Claims, 33 Drawing Sheets

(56) References Cited

U.S. PATENT DOCUMENTS

| | | |
|---|---|---|
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,670,935 A | 9/1997 | Schofield et al. |
| 5,724,316 A | 3/1998 | Brunts |
| 5,737,226 A | 4/1998 | Olson et al. |
| 5,760,826 A | 6/1998 | Nayar |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mod et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao |
| 6,001,486 A | 12/1999 | Varaprasad et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,201,642 B1 | 3/2001 | Bos |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,442,465 B2 | 8/2002 | Breed et al. |
| 6,476,730 B2 | 11/2002 | Kakinami et al. |
| 6,477,464 B2 | 11/2002 | McCarthy et al. |
| 6,483,429 B1 | 11/2002 | Yasui et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek |
| 6,516,664 B2 | 2/2003 | Lynam |
| 6,534,884 B2 | 3/2003 | Marcus et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,610 B1 | 8/2003 | Stam et al. |
| 6,627,918 B2 | 9/2003 | Getz et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjonell |

(56) References Cited

U.S. PATENT DOCUMENTS

| | | |
|---|---|---|
| 6,757,109 B2 | 6/2004 | Bos |
| 6,762,867 B2 | 7/2004 | Lipped et al. |
| 6,794,119 B2 | 9/2004 | Miles |
| 6,795,221 B1 | 9/2004 | Urey |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,825,880 B2 | 11/2004 | Asahi et al. |
| 6,847,487 B2 | 1/2005 | Burgner |
| 6,882,287 B2 | 4/2005 | Schofield |
| 6,889,161 B2 | 5/2005 | Winner et al. |
| 6,898,495 B2 | 5/2005 | Tanaka et al. |
| 6,909,753 B2 | 6/2005 | Meehan et al. |
| 6,940,423 B2 | 9/2005 | Takagi et al. |
| 6,946,978 B2 | 9/2005 | Schofield |
| 6,947,064 B1 | 9/2005 | Hahn et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,149,613 B2 | 12/2006 | Stam et al. |
| 7,167,796 B2 | 1/2007 | Taylor et al. |
| 7,202,776 B2 | 4/2007 | Breed |
| 7,227,459 B2 | 6/2007 | Bos et al. |
| 7,227,611 B2 | 6/2007 | Hull et al. |
| 7,257,486 B2 | 8/2007 | Shimazaki et al. |
| 7,295,227 B1 | 11/2007 | Asahi et al. |
| 7,366,595 B1 | 4/2008 | Shimizu et al. |
| 7,369,940 B2 | 5/2008 | Frank et al. |
| 7,526,103 B2 | 4/2009 | Schofield et al. |
| 7,598,887 B2 | 10/2009 | Sato et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,680,570 B2 | 3/2010 | Mori |
| 7,720,580 B2 | 5/2010 | Higgins-Luthman |
| 7,914,187 B2 | 3/2011 | Higgins-Luthman et al. |
| 8,285,479 B2 | 10/2012 | Kawabata et al. |
| 8,451,107 B2 | 5/2013 | Lu et al. |
| 8,874,317 B2 | 10/2014 | Marczok et al. |
| 9,646,428 B1 * | 5/2017 | Konrardy .............. B60W 30/16 |
| 10,214,206 B2 * | 2/2019 | Latotzki ................ B62D 15/027 |
| 2002/0113873 A1 | 8/2002 | Williams |
| 2002/0198634 A1 | 12/2002 | Shimazaki et al. |
| 2003/0080877 A1 | 5/2003 | Takagi et al. |
| 2003/0137586 A1 | 7/2003 | Lewellen |
| 2003/0222982 A1 | 12/2003 | Hamdan et al. |
| 2004/0130464 A1 | 7/2004 | Schindler et al. |
| 2004/0153243 A1 | 8/2004 | Shimazaki et al. |
| 2005/0203704 A1 | 9/2005 | Frank et al. |
| 2005/0285758 A1 | 12/2005 | Matsukawa et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Wildmann et al. |
| 2006/0287825 A1 | 12/2006 | Shimizu et al. |
| 2006/0287826 A1 | 12/2006 | Shimizu et al. |
| 2007/0021881 A1 | 1/2007 | Mori |
| 2007/0104476 A1 | 5/2007 | Yasutomi et al. |
| 2007/0177011 A1 * | 8/2007 | Lewin ................ B62D 15/0285 348/118 |
| 2008/0077294 A1 | 3/2008 | Danz et al. |
| 2008/0211651 A1 | 9/2008 | Beutnagel-Buchner et al. |
| 2009/0113509 A1 | 4/2009 | Tseng et al. |
| 2009/0121899 A1 * | 5/2009 | Kakinami .......... G06K 9/00805 340/932.2 |
| 2009/0143967 A1 * | 6/2009 | Lee .......................... B60R 1/00 701/119 |
| 2009/0157260 A1 | 6/2009 | Lee |
| 2010/0013670 A1 | 1/2010 | Hueppauff et al. |
| 2010/0039292 A1 | 2/2010 | Scherl et al. |
| 2010/0045797 A1 | 2/2010 | Schofield et al. |
| 2010/0235053 A1 | 9/2010 | Iwakiri et al. |
| 2010/0286872 A1 | 11/2010 | Endo et al. |
| 2013/0046441 A1 | 2/2013 | Marczok et al. |
| 2013/0103246 A1 | 4/2013 | Staack |
| 2013/0116859 A1 | 5/2013 | Ihlenburg et al. |
| 2013/0184925 A1 * | 7/2013 | Niemz .................. B60W 50/14 701/25 |
| 2013/0231824 A1 * | 9/2013 | Wilson ............... G01C 21/3415 701/26 |
| 2013/0314503 A1 * | 11/2013 | Nix .................... G06K 9/00805 348/46 |
| 2013/0335553 A1 * | 12/2013 | Heger .................... B60Q 9/008 348/118 |
| 2014/0067206 A1 | 3/2014 | Pflug |
| 2014/0081476 A1 * | 3/2014 | Verdugo-Lara ...... B62D 15/027 701/1 |
| 2014/0132767 A1 * | 5/2014 | Sonnabend ........ G06K 9/00476 348/148 |
| 2014/0354811 A1 | 12/2014 | Weber |
| 2014/0375476 A1 | 12/2014 | Johnson et al. |
| 2015/0022664 A1 | 1/2015 | Pflug et al. |
| 2015/0042808 A1 | 2/2015 | Pflug |
| 2015/0081174 A1 | 3/2015 | Marczok et al. |
| 2015/0124096 A1 | 5/2015 | Koravadi |
| 2015/0153735 A1 * | 6/2015 | Clarke .................... G06T 7/285 701/301 |
| 2015/0158499 A1 | 6/2015 | Koravadi |
| 2015/0251599 A1 | 9/2015 | Koravadi |
| 2015/0271201 A1 * | 9/2015 | Ruvio .................... G06N 20/00 726/23 |
| 2015/0344028 A1 | 12/2015 | Gieseke et al. |
| 2016/0028824 A1 * | 1/2016 | Stenneth .................. G08G 1/0112 709/219 |
| 2016/0096477 A1 | 4/2016 | Biemer |
| 2016/0162747 A1 | 6/2016 | Singh et al. |
| 2017/0015312 A1 * | 1/2017 | Latotzki ................ B62D 15/027 |
| 2017/0083774 A1 | 3/2017 | Solar et al. |
| 2017/0212511 A1 * | 7/2017 | Paiva Ferreira ........ G07C 5/008 |
| 2018/0194343 A1 * | 7/2018 | Lorenz ................ G05D 1/0282 |

* cited by examiner

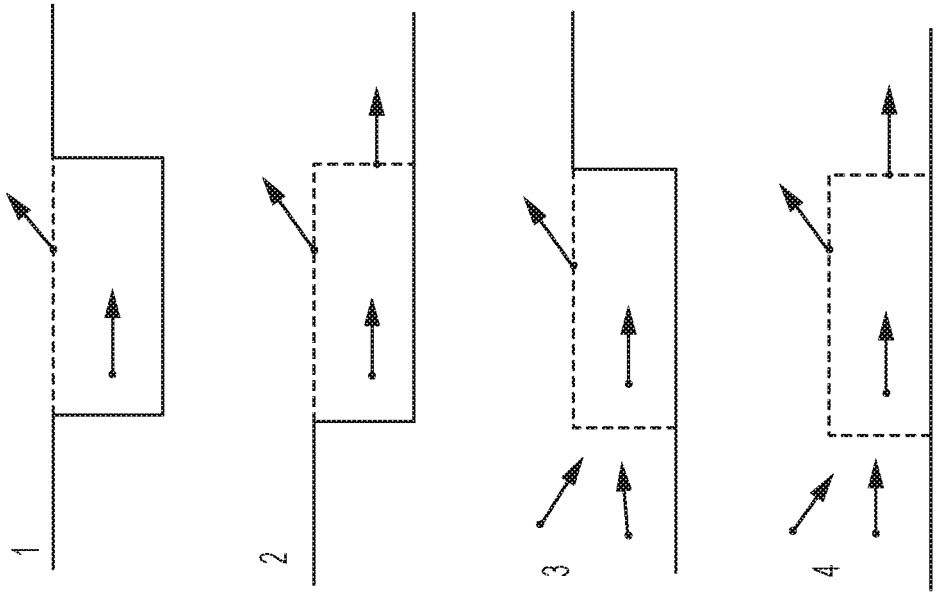

FIG. 3B

1. Standard parallel parking slot with entry nod
2. A parallel parking slot with an open side on t right: can be approached from the right side.
3. Same as befor but with open left side: can approached from left side or as case 1.
4. Combincation of all cases abov Case 1 has to be solved analytically to find a proper entry node from cases 2 to 4: Plan a path to the final node and place the entry node in a predefined distance to $A_f$ on this path.

*The strategy how to park in paralle parking slots is dependent on the size of the slot. Narrow slots for example require a sequence of s-turns.
*In all cases we can determine a vali entry node and also derive a minimal set of reversal nodes.

*Sequence of maneuvers:
1. Get in traffic flow towards parking spa
2. Drive near parking space entry
3. Drive to parking space entry k     $_e$ <>
4. Drive into parking
<> might include reversing of the car, which is a subroutine

- This page shows some easy pattern to reverse a car together with the space needed (in red) for each maneuver. To check whether a space fits in a situation taken from a map it is helpful to assume easy polygons surrounding the red space.
- A is only of theoretical interest as it assumes in infinite number of sweeps.

resulting path A
with construction circles and tangents

Legend:
| possible path
| start- and end- position's circle
| tangenting help circles
| parking lot's borderline
• section's nodes resulting path A
without construction circles and tangents resulting path B
with construction circles and tangents Legend:
| possible path
| start- and end- position's circle
| tangenting help circles
| parking lot's borderline
• section's nodes resulting path B
without construction circles and tangents resulting path C
with construction circles and tangents Legend:
| possible path
| start- and end- position's circle
| tangenting help circles
| parking lot's borderline
• section's nodes resulting path C
without construction circles and tangents resulting path D
with construction circles and tangents Legend:
| possible path
] start- and end- position's circle
| tangenting help circles
| parking lot's borderline
• section's nodes resulting path D
without construction circles and tangents

METHOD FOR AUTOMATED PARKING OF A VEHICLE

CROSS REFERENCE TO RELATED APPLICATIONS

The present application is a continuation of U.S. patent application Ser. No. 15/206,801, filed Jul. 11, 2016, now U.S. Pat. No. 10,214,206, which claims the filing benefits of U.S. provisional application Ser. No. 62/191,683, filed Jul. 13, 2015, which is hereby incorporated herein by reference in its entirety.

FIELD OF THE INVENTION

The present invention relates generally to a parking assist system for a vehicle and, more particularly, to a parking assist system that utilizes a plurality of sensors at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a parking assist system or vision system or imaging system for a vehicle that utilizes one or more cameras (preferably one or more CMOS cameras) and/or other sensors to capture data representative of objects and roads exterior of the vehicle, and determines a path of travel for the vehicle from its initial or current location to a determined target parking space. The system may determine the target parking space responsive to information received from a remote source (such as a parking lot management system or the like) or based on sensor data captured by one or more sensors of the vehicle. The system may then determine the path of travel for the vehicle based on the steering capabilities of the vehicle and based on other parameters, including preferred acceleration and deceleration parameters and obstacles and the like that are determined to be in the path of travel (such as responsive to data processing of data captured by the vehicle cameras or sensors).

These and other objects, advantages, purposes and features of the present invention will become apparent upon review of the following specification in conjunction with the drawings.

BRIEF DESCRIPTION OF THE DRAWINGS

FIG. 3B are schematics showing different parking slots and entry/exit nodes or knots having different directions which are given by the turning radii of the vehicle of FIG. 3A, with the parking space in FIG. 3A having no bordering lines while in FIG. 3B there are some (solid) borderlines that limit the entry and exit nodes;

DESCRIPTION OF THE PREFERRED EMBODIMENTS

A parking assist system and/or vehicle vision system and/or driver assist system and/or object detection system and/or alert system operates to capture data exterior of the vehicle and may process the captured data to detect objects at or near the vehicle and in a predicted path of the vehicle, such as to assist a driver of the vehicle in maneuvering the vehicle in a rearward direction or such as to control the vehicle along a determined or selected path of travel. The system may include a plurality of cameras or image sensors and an image processor or image processing system that is operable to receive image data from one or more of the cameras and optionally other sensors and processing systems to determine objects or obstacles and the like along the determined path of travel.

Figure 1:
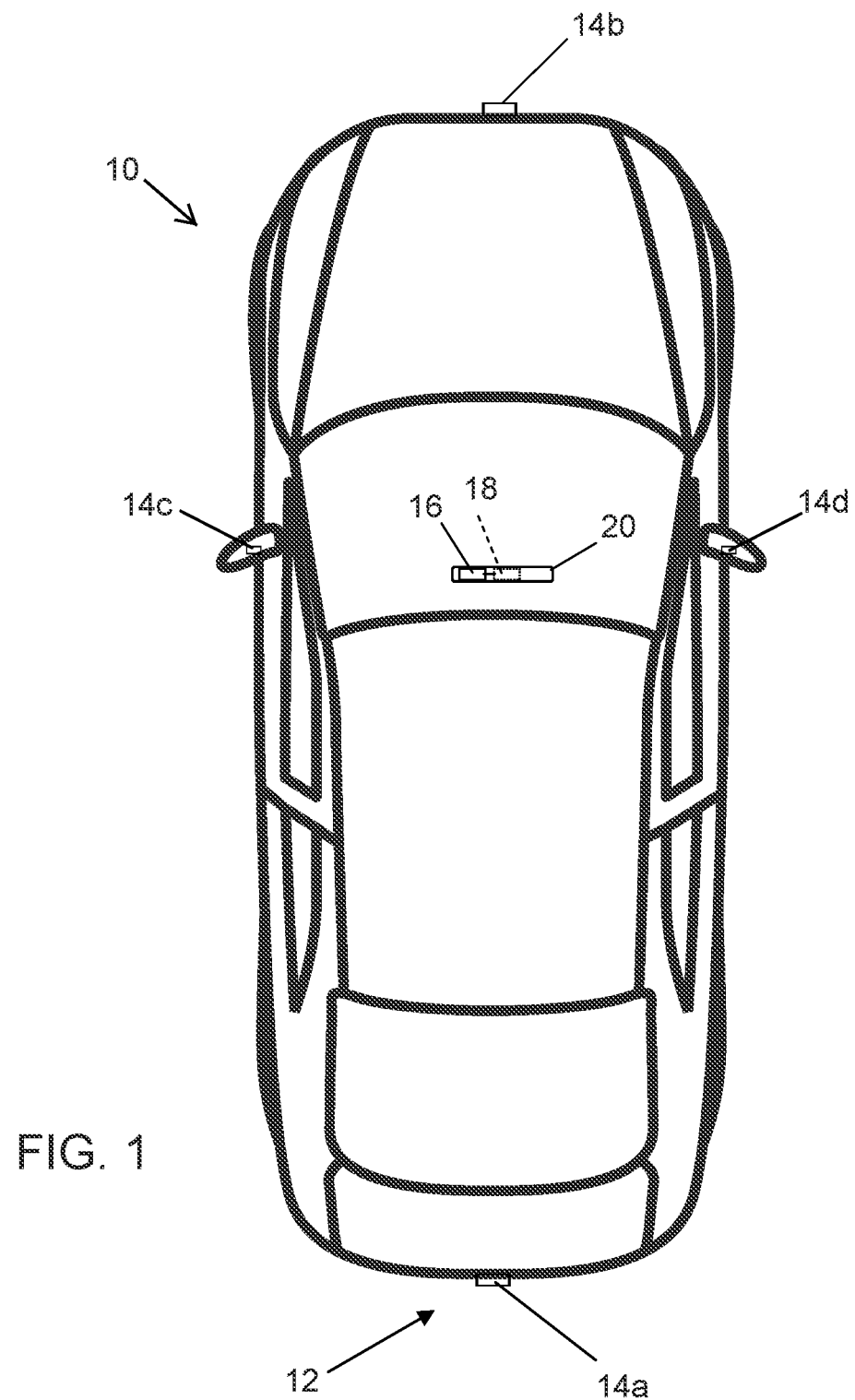
FIG. 1 is a plan view of a vehicle with a vision system that incorporates sensors in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

While driving autonomously, the system may not have an exact measurement of the whole situation from start to finish or may have just a portion of it, it only knows the rough task of where to go. But the system (responsive to data processing of data captured by the vehicle sensors) has knowledge about the near surroundings that are of interest. Therefore, the system can derive a rough plan of where to drive considering obstacles, driveways, and the like, but typically plans for the next few meters only (inside the area well known). For example, the system may first find a possible way to head in direction of the target, then define a distant knot or node (a node may be an inter-waypoint, turning point or target point) on this path in known areas, and then plan a precise path to this node and drive the vehicle along the path section in between the nodes and repeat the steps with gained knowledge while driving.

Optimal Control algorithms (OCA) find local minima only, to find the global minimum, several starting conditions would need to be tried. However, as discussed above, the system does not need to find the global optimum, but just a feasible solution.

Optimal Control algorithms are of additional interest as they are able to define an enhanced or optimal standard. However, if it turns out that the calculation costs are too high some kind of geometrical construction for the path could be thought of as well. But these normally struggle with the non-holonomic characteristics of a vehicle.

Assuming that the system knows how to drive to the next node without a change of driving direction while avoiding all static obstacles (for moving obstacles it probably just has to wait for them to disappear or set additional nodes to get around them), all the system needs is a concept to place those nodes in a useful manner:

Change of direction

Separation of path into small parts

Positioning of vehicle to get better measurements of surroundings by the sensors Guidance along obstacles like bottlenecks, curbs, parking space boundaries, traffic (for example avoiding traffic on two-lane road) and/or the like.

It seems useful to break down the drive into different parts to be able to place nodes in the right manner—this reflects the behavior of a human driver. Some general rules include:

Determine traffic flow in direction of parking spot;

If the parking space is far away: Get in traffic flow and drive towards parking space (doing this might require to turn (reverse) the vehicle);

If the park slot is narrow, it has a predefined entry node;

Get the vehicle to the parking slot entry node; and

If necessary the vehicle should be reversed as near to the parking slot as possible.

If the vehicle initially is far away from the parking spot it may be necessary to get into the traffic flow to approach it. For a parking lot the vehicle should stay to the right when the traffic is a right hand traffic, and on the left when the traffic is left hand traffic, but with a certain distance to parking vehicles—if the surroundings allow this. In narrow passages it is best to stay in the middle. This task may be part of automated driving.

Figure 3A:
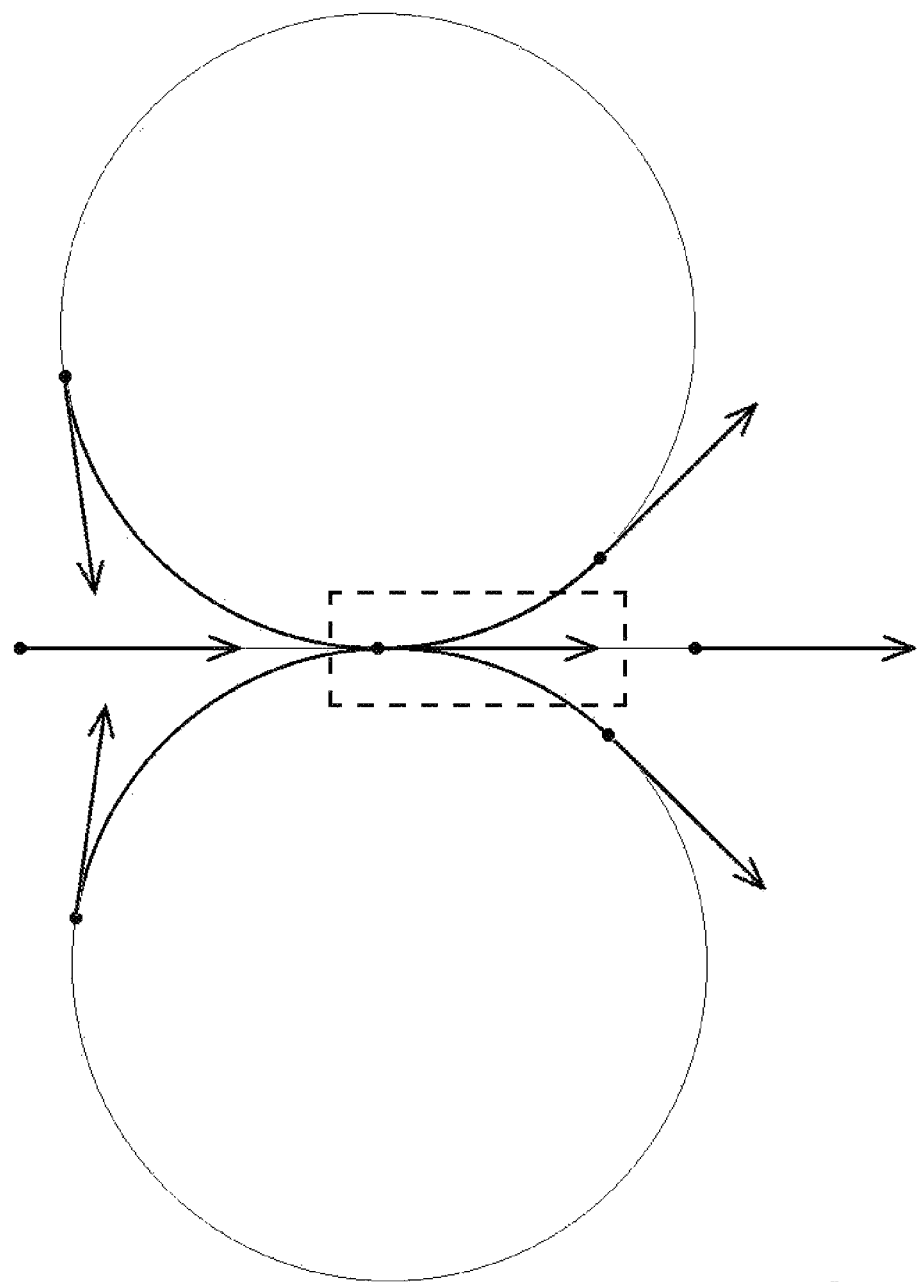
FIG. 3A is a schematic showing minimum turning radii for a vehicle at a parking space.

It is useful to classify parking slots by the open sides from which the slot can be approached. The dotted parking spot in FIG. 3A shows all three six entry points, from these on the right the vehicle will have to back up in. In FIG. 3B the entry points are limited by (solid) parking spot boderlines. Examples are for parallel parking, perpendicular parking and unclassified parking (which can be understood as either parallel or perpendicular depending on which side the parking slot gets approached). See FIGS. 3A, 3B and 5A-C for strategies for parallel parking situations. Since parking slots are not always rectangular parking slots, they can be interpreted as quadrangles, and diagonal parking spaces can be interpreted as perpendicular parking spaces.

Figure 5A:
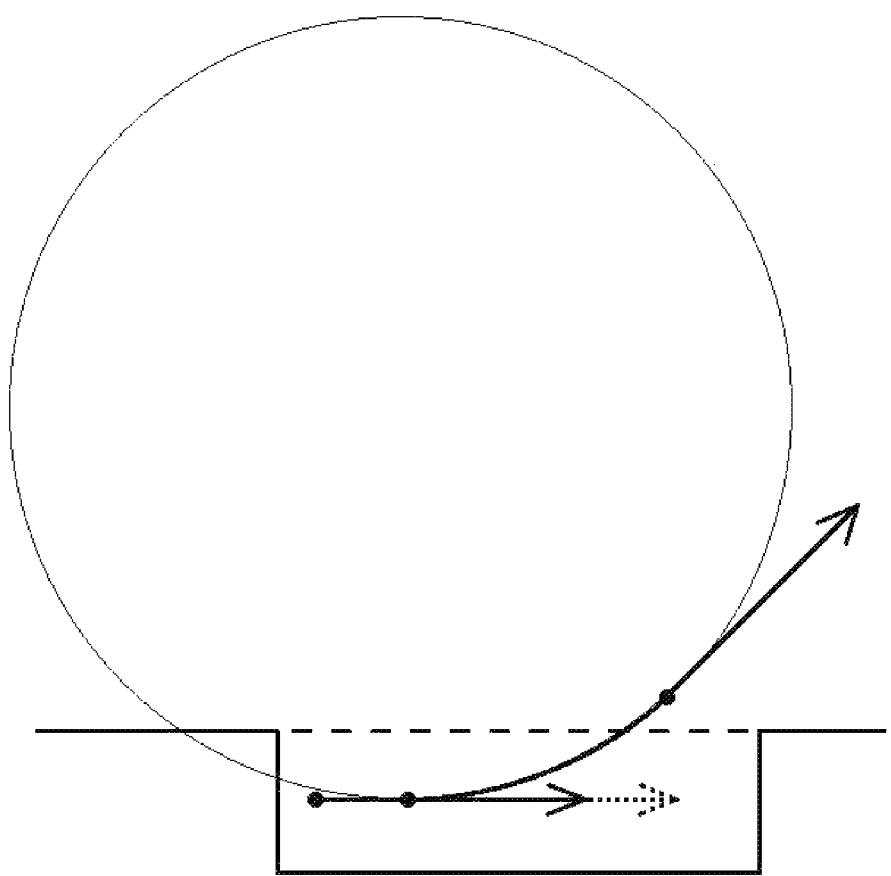
FIG. 5A shows the entry/exit path of a parallel parking spot constructed using straight driving path sections and circles which represent the maximum turning circle for the automated parking assist system of the present invention, where the black dots along the path can be used as nodes of the path's sections which are subject of optimization by optimal control by using a cost function and borderline constraints.
Figure 5B:
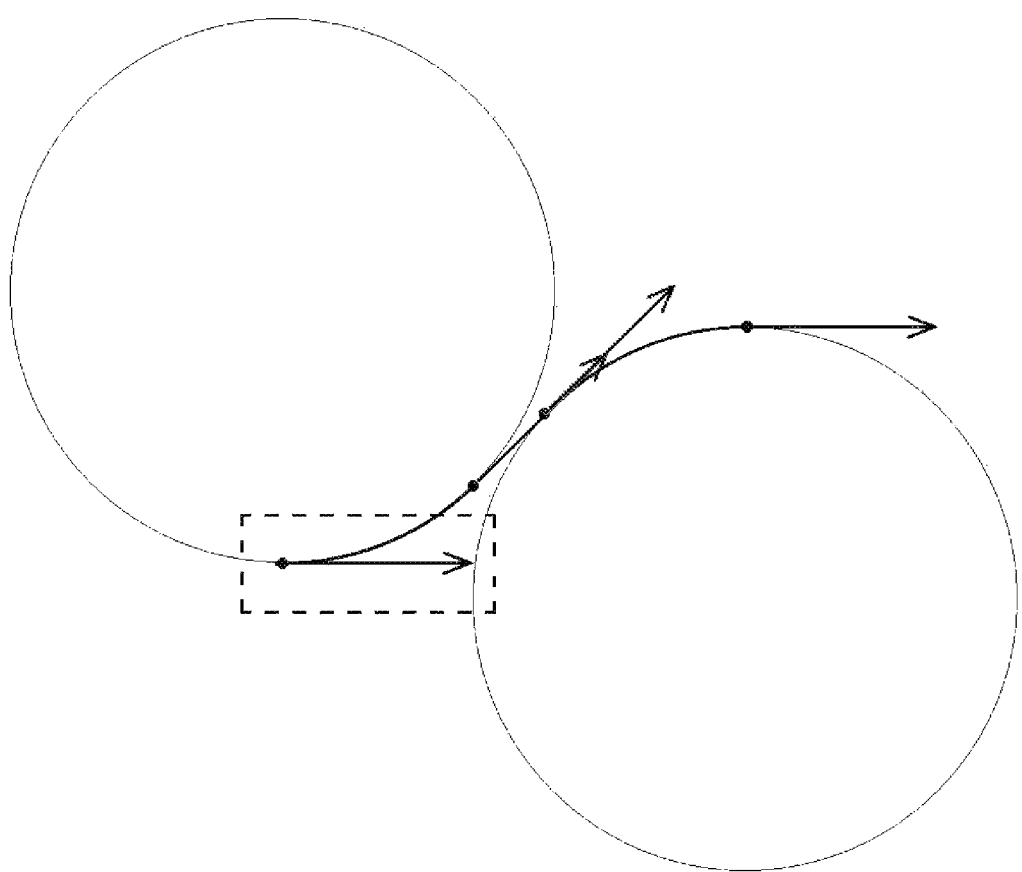
FIG. 5B shows the entry/exit path with its nodes using straight driving path sections (in between the nodes) and circles which represent the maximum turning circle for the automated parking assist system of the present invention, whereby, with addition of another straight path section and another path construction circle, a full S-shape exit/entry— path can be constructed which can also be optimized by optimal control in accordance with the present invention.
Figure 5C:
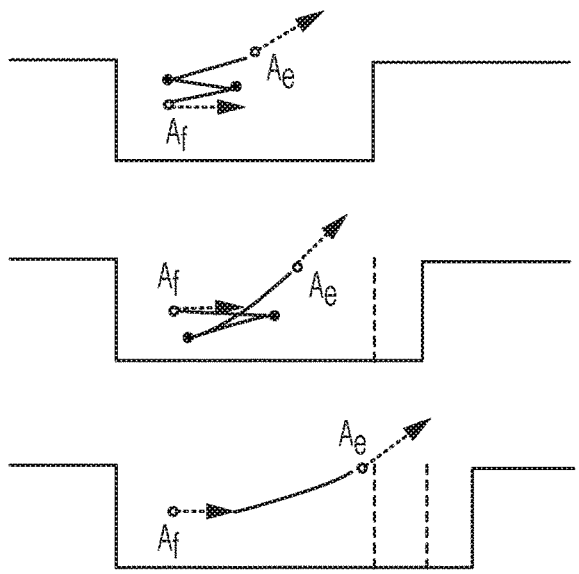
FIG. 5C shows parking strategies for a parallel parking slot for the automated parking assist system of the present invention, showing the turning points (or reversal nodes), where the narrower the parking lot gets the more maneuvers have to be executed (and the more nodes have to be set), with the path of the top strategy in FIG. 5C comprising consecutive s-shape paths similar to those shown in FIG. 5B.

The extreme entry nodes for approaches from the far left or right can be found by assuming circles the outline of a vehicle take by driving the minimum radius (at maximum steering angle) as shown in FIG. 5A (the minimum turning radius of the vehicle may be provided to the control or system as an input or preprogrammed therein for the particular vehicle equipped with the parking assist system or any suitable means). By adding circled and straight path elements to an entry path such as shown in FIG. 5B, eventually with changing the driving direction path trajectories can be found which lead the parking entry point in the desired vehicle orientation. The system does not intend the vehicle to end up right at the front or rear border of a parking slot but at a defined position in the middle, by that straight driving elements may be added to the driving path (last stroke) (see dotted arrow in FIG. 5A). As the parking slot is open at the front or back, it is easy to correct the end-position and end-orientation within the spot, see FIGS. 3B and 5C (lowest). The system can move the turning circles to avoid sweeps inside the parking slot. As shown in FIG. 5C, the middle and the highest examples show more narrow parking slots. For entering lower ones more direction changes will be necessary. It is possible to also construct these trajectories by adding straight and circled path elements to one another.

It is only necessary to analytically place an entry node if the parking slot is narrow (to make sure the system can find a way in without too much routing inside the parking slot) depending on the side that the vehicle is approaching it from. But even if it is possible to plan a path directly to the final parking position it is beneficial to define an entry node. This can be located on the calculated path in a defined distance to the final parking position.

In tight spaces and while reversing a vehicle it is necessary to understand some basics regarding vehicle maneuverability (such as by determining circles representative of the vehicle's turning radius or minimum turning radius):

To find out whether a vehicle can turn without hitting an obstacle the system can assume the minimum turning radius, calculate the inner and outer circle for the outline of the vehicle and check or determine whether an obstacle is too near or too far away.

The minimum turning radius would not allow to react on control deviations, so it should be widened a little. This also helps with smoothening of paths which gets done by the optimal control algorithms.

An easy path (nothing more than a simple S-turn) is not available if one node is inside the minimum radius ($r_{min}$) turning circle of its predecessor. But normally one or more complex paths can be found.

If the minimum distance $d_{min}$ of each two centers of the minimum radius turning circles is at least 2× $r_{min}$ an easy path between these two nodes exists.

If the minimum distance $d_{min}$ of each two centers of the minimum radius turning circles is between $r_{min}$ and 2 $r_{min}$, the angle of easily reachable nodes is dependent on its position and the distance of the node from the center of the minimum turning circle.

If an easy path can be found to drive from A to B it should be taken. If not, the system includes a simple set of rules which works in situations where the vehicle needs to turn and/or shift. The objectives include:

Avoid traffic if possible;
Minimize the number of sweeps;
Minimize the maneuvering zone;
Minimize steering;
Avoid curbs;
Maximize distance to obstacles.

An ego vehicle with inherent environmental sensors (such as, for example, visual cameras, infrared cameras, ultrasound sensors, time of flight (TOF) sensors, LIDAR sensors, RADAR sensors or gray level transition sensors (such as described in U.S. Publication No. US-2016-0096477, which is hereby incorporated herein by reference in its entirety) and sensor processing system may be given. Optionally, the vehicle may have devices for remote data communication (radio waves, optically, acoustically). A rough road scene map may be generated or input. It may have been transmitted from remote (such as, for example, from a parking lot management system, parking house management system, remote parking spot providing server system, or the like) or may be generated by processing of a scene understanding system of a vehicle sensor processing system, such as by utilizing aspects of the systems described in U.S. Publication No. US-2015-0344028, which is hereby incorporated herein by reference in its entirety.

Figure 2:
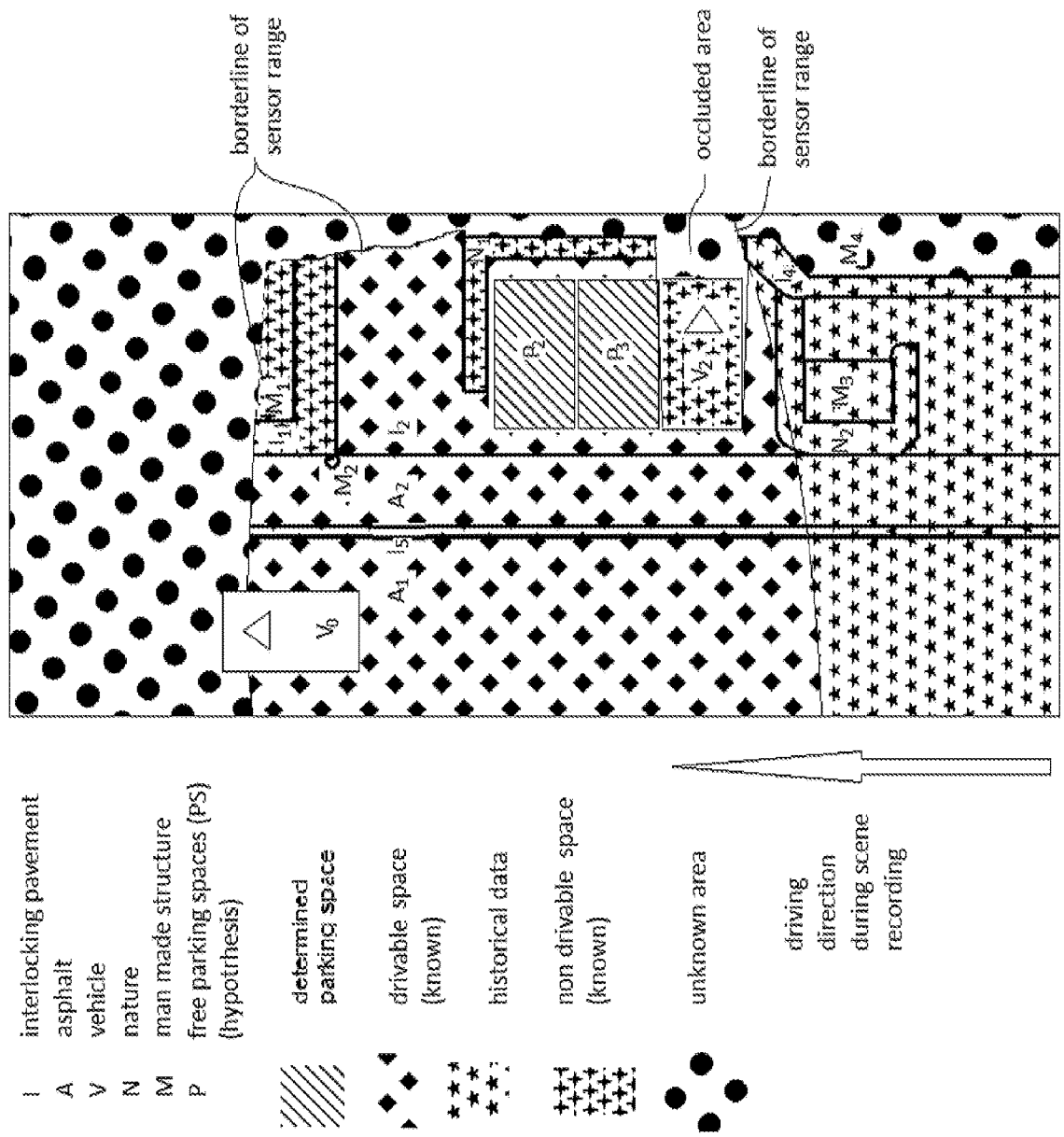
FIG. 2 is a plan view of an environment having parking spaces at which a vehicle may be parked via the automated parking assist system of the present invention.

The scene may have been detected and stored while the vehicle was driving along a parking area such as a city road side, parking lot or such like passing occupied and free parking spaces. The free parking spaces (PS) may have been entered to the scene map such as shown in FIG. 2 and one of the spaces may have been chosen (given) as a target parking lot (such as, for example, $P_2$ in the example of FIG. 2) for the automated parking assist system (APAS) of the present invention. By that the system may have a rough scene map with a current position the (ego-) vehicle $V_0$ is within and a target position. The map may also contain at least the 'non drivable space' (OS), the 'drivable free space' (FS), 'unknown, so far not detected space supposedly free' (UF), 'unknown, so far not detected space supposedly not drivable' (UO). Optionally, the map may contain additionally the heights of the space components (3rd dimension), timestamp and scoring parameters (availability, reliability) of each grid element (alternatively the may map may be vector based instead of grid based, by that the third dimension may than be expressed in the vectors), a labeling of the drivable terrain (for example, 'interlocking pavement type 1, 2, 3 . . . ', 'asphalt', 'gravel' and the like) and of the non-drivable terrain or obstacles (such as 'man made structure', 'nature', 'human', 'animal' or 'vehicle' or the like).

As a preferred option, the system may first calculate (or plan) and simulate the general parking path before executing the parking maneuver. Optionally, the simulation may be split into a (rough) geometrically constructed path (strategy) planning and a consecutive smoothing phase based on a numerical minimization algorithm called optimal control [algorithm] (OCA) specified further below. Though the path planning without smoothing may be sub-optimally sufficient but requires less processing resources, these geometrically constructed solutions normally struggle with the non-holonomic characteristics of the vehicle and feel quite artificial or uncomfortable to the vehicles' passengers (passively getting driven into the parking space).

During parking-driving execution, the remaining path may become newly replanned, updated or revised as parts of the prior unknown or roughly detected scene elements may come into sensor range and by that be detected or determined more precisely, or the scene may change during execution. The park planner may have to react by altering the planned path upon such a scene change (such as, for example, when a neighboring parking lot gets occupied, and by that time the scene is not drivable any more (the free space (FS) changes to occupied space (OS)) and the planner has to reflect this new restriction in the path planning.

Typically, the path gets likely more complicated than less by such changes. In some cases the chosen or target parking space will become unreachable. The driving task then will have to be aborted. In case pedestrians are within the parking space or in the way to it, the system may not replan the entering path, but just stop and wait (for a certain duration) until the pedestrians have left the parking space or path to it.

In cases where the vehicle needs to drive a longer way to a parking space without driver interaction, Automated Parking is a sub-functionality of autonomous driving. Every driving task can be defined as driving from A to B. With autonomous driving, the system separates the whole task in steps, still driving from A to B, but then to C and so on. This leads to a chain of nodes on your way $A_0, A_1, \ldots A_f$, with $A_0$ being the start position and $A_f$ the final position. Because the system only needs to find its way to the next $A_k$, it still just needs to drive "from A to B". Thus, the system may use two algorithms: planning of a path from A to B while considering the drivable area and the vehicle's abilities; and setting nodes to guide the vehicle around major obstacles while still considering the drivable area and the vehicle's abilities (these nodes can also be used to define a necessary direction of travel).

In some simpler cases some of the following procedures may not apply: In general the parking task starting on a position A, having any ego speed and heading, and ending on a parking spot B in a specific orientation with the end speed zero may be solved by splitting the task in five steps:

First, as a preferred option the given parking spot may be classified and a preferred entry point (EP) and entry orientation may be determined, see FIGS. 3 and 4A-C. It is only necessary to analytically place an entry node if the parking slot is narrow (to make sure the system can find a way in without too much routing inside the parking slot) depending on the side that the vehicle is approaching it from. But even if it is possible to plan a path directly to the final parking position it is beneficial to define an entry node. This can be located on the calculated path in a defined distance to the final parking position. The reason being that the system needs to calculate with better accuracy inside a parking slot.

The classification may also state whether a specific driving scheme shall be selected for maneuvering within the parking lot (for accurate orientation and positioning). Since driving tasks within a parking lot have a high similarity the use of pre-optimized trajectory templates appears more effective than drafting and optimizing that paths (within a parking lot) always freely (as alternative firstly option), see FIG. 5.

Second, determining whether the entry point is in close distance or whether the vehicle has to enter the traffic flow to narrow to the parking spots entry point.

Figure 4A:
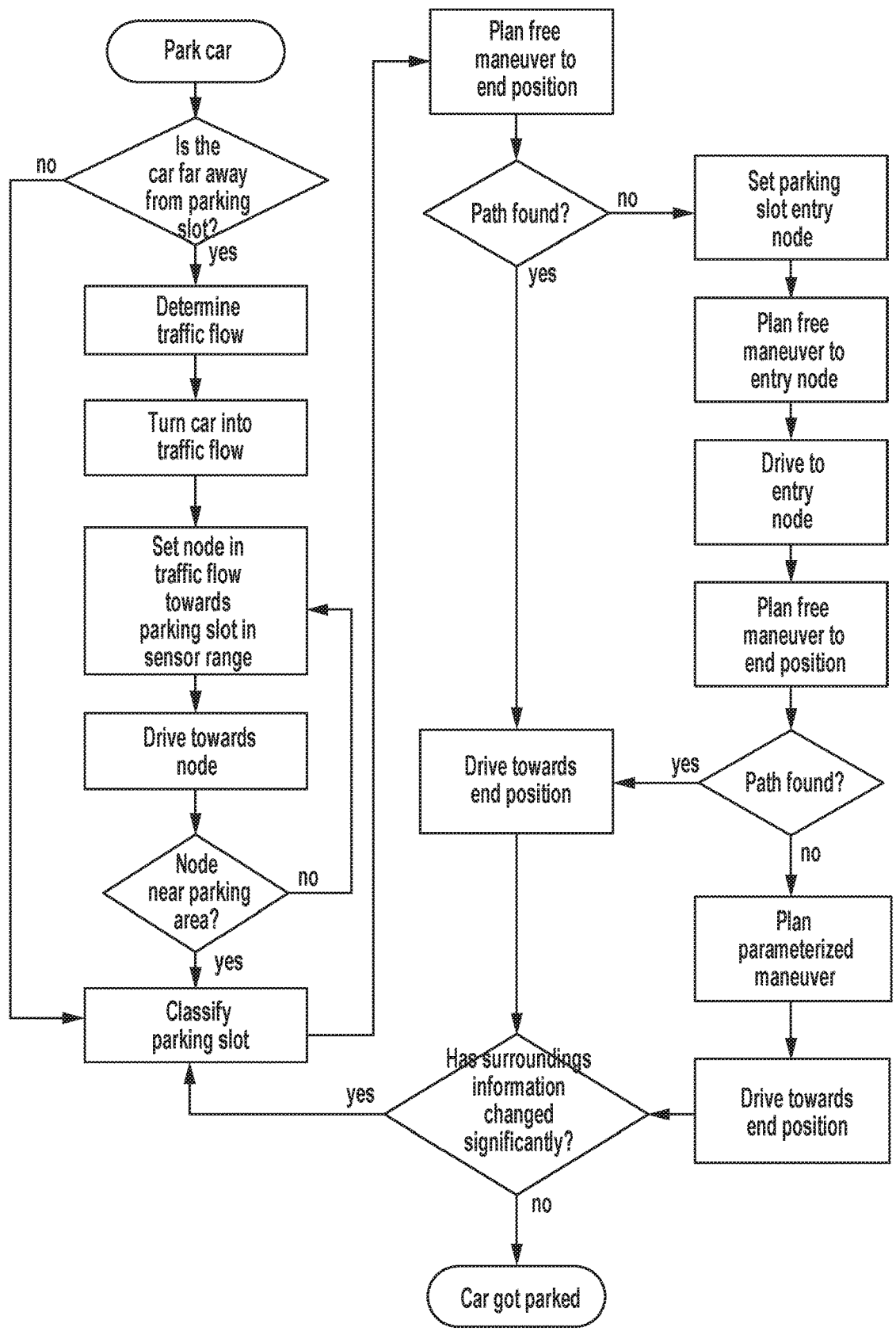
FIGS. 4A-I are flow charts showing operational steps of the automated parking assist system of the present invention.
Figure 4B:
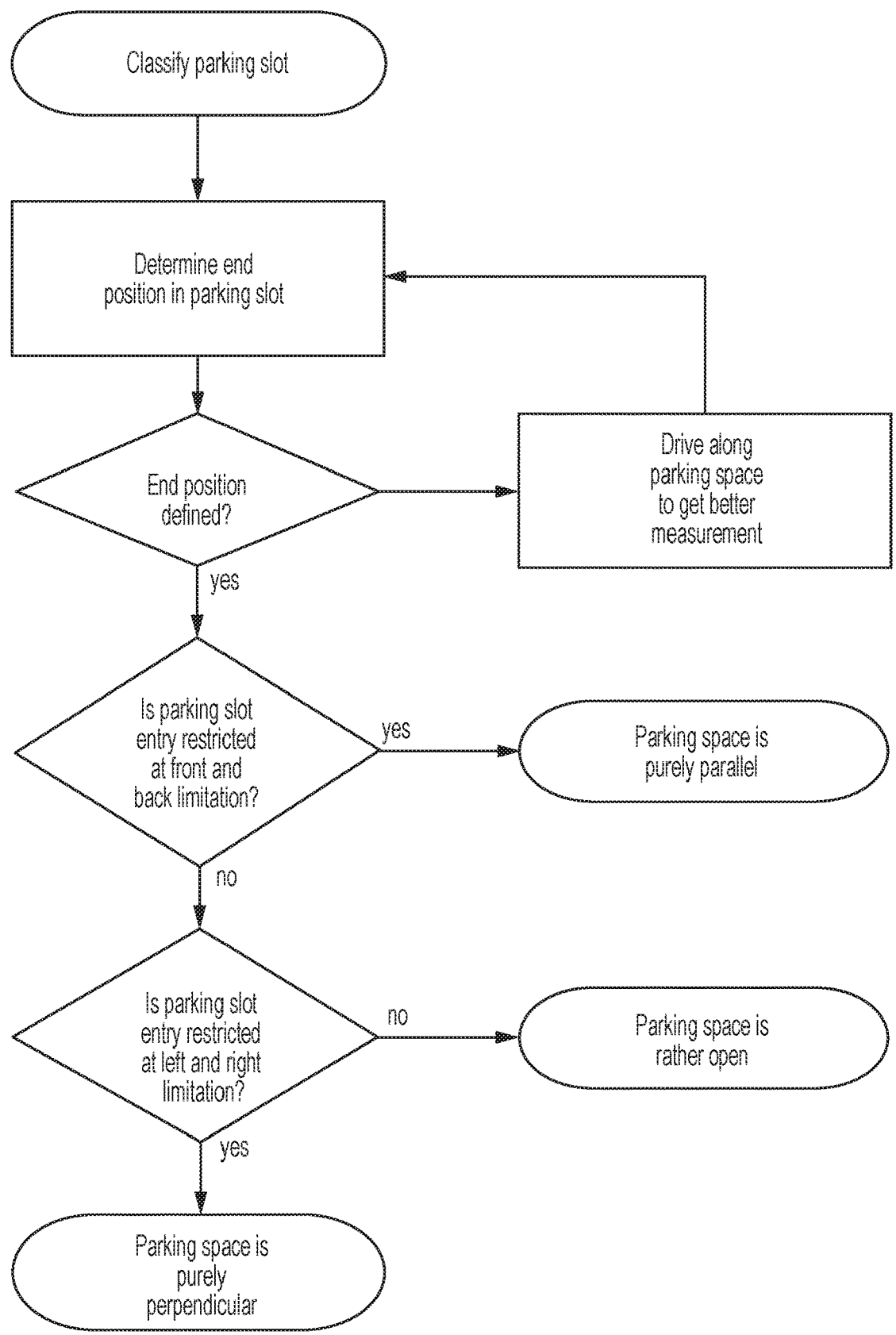
Figure 4C:
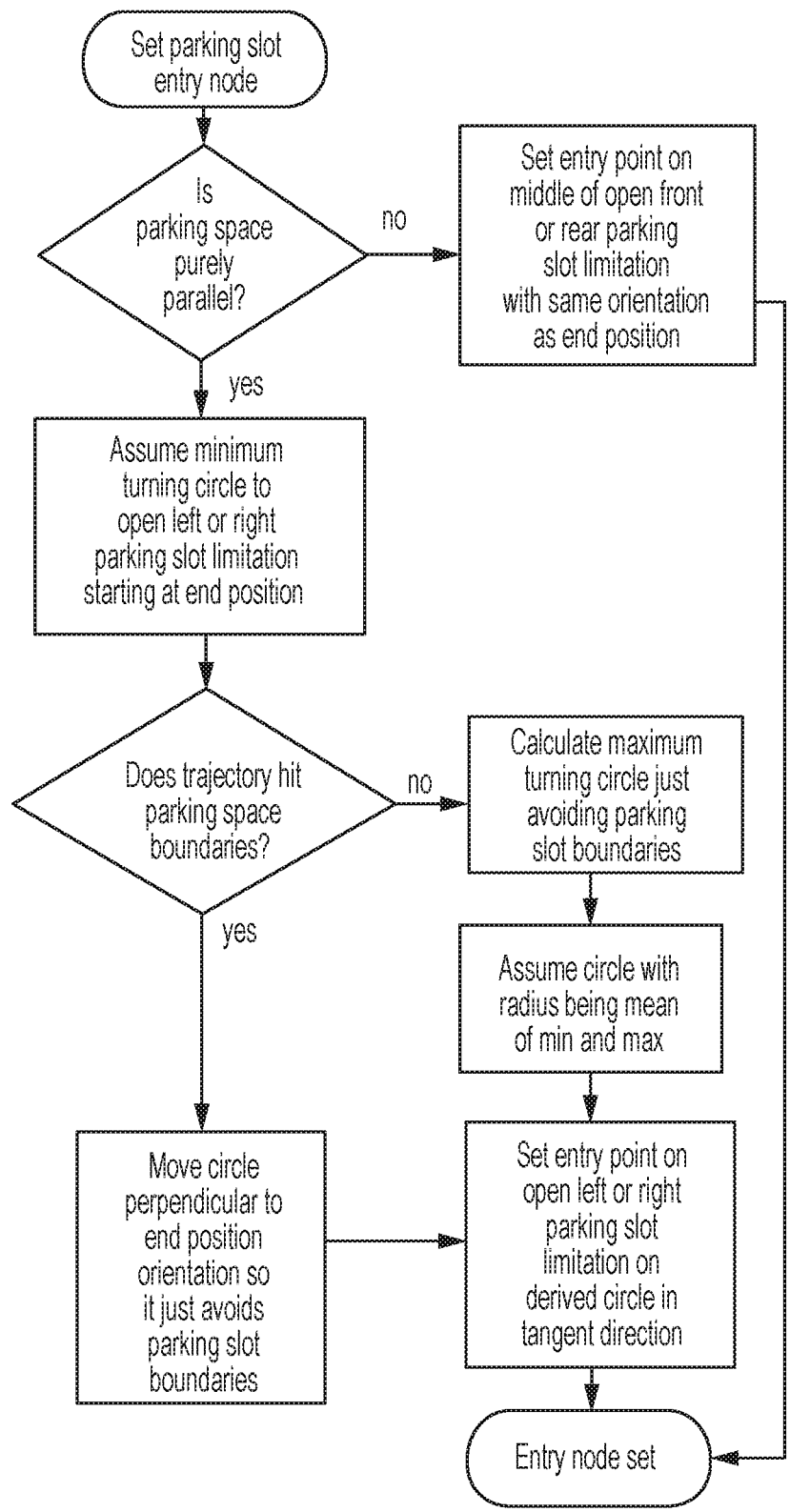
Figure 6:
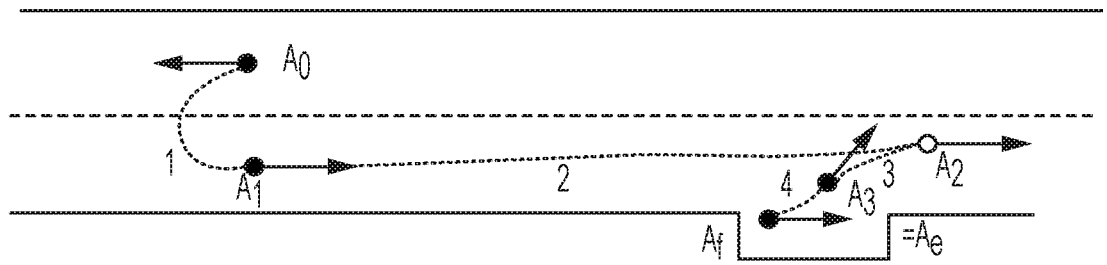
FIG. 6 shows a sequence of maneuvers for a vehicle to park via the automated parking assist system of the present invention.
Figure 7:
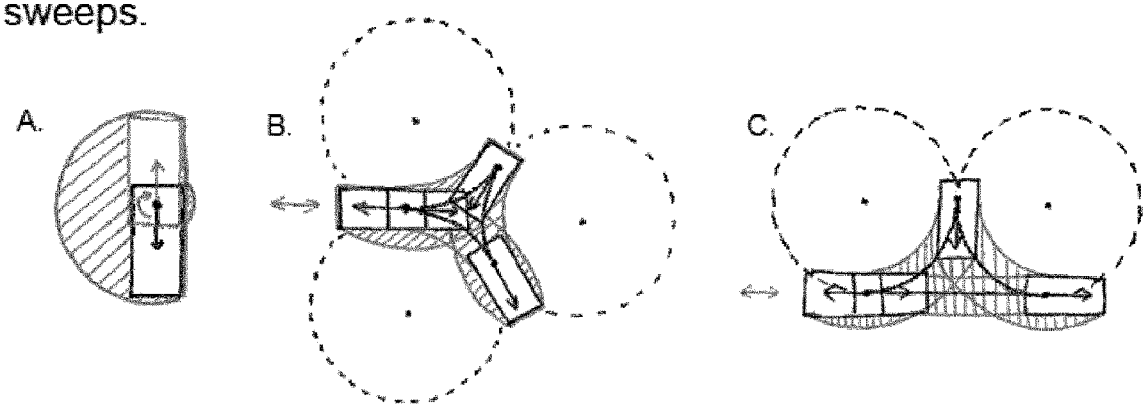
FIG. 7 shows options for how a vehicle may be reversed by the automated parking assist system of the present invention.

Third, if above is 'yes' it is to decide whether the vehicle has to turn around before entering the traffic flow for not driving backwardly in traffic (see FIG. 6 and flow chart of FIG. 4A). Optionally, the entering and turning around may be done at once (see (1) in FIG. 6). Optionally, the turning around may utilize a pre-optimized trajectory template such as shown in FIG. 7, or in an alternative option the turning around may be planned freely. In all cases a narrowing to the parking lot will be planned to be done then.

Fourth, assuming in all cases the ego vehicle is now close to the dedicated parking spot, an entering maneuver or as optional alternative (from first) a maneuver towards the entering point (EP) may then be required. This may be done by entering directly (comparably easy case), see (2), (3), (4) in FIG. 3 or (the comparably complicated case) may require one or several strokes (which may affect a full or partial turn around (again)), see (1) in FIG. 3.

The result will be a general driving strategy for reaching and entering the parking spot or the result will be that the parking task was mistakenly given since the parking spot isn't enterable and is to be aborted.

Figure 4D:
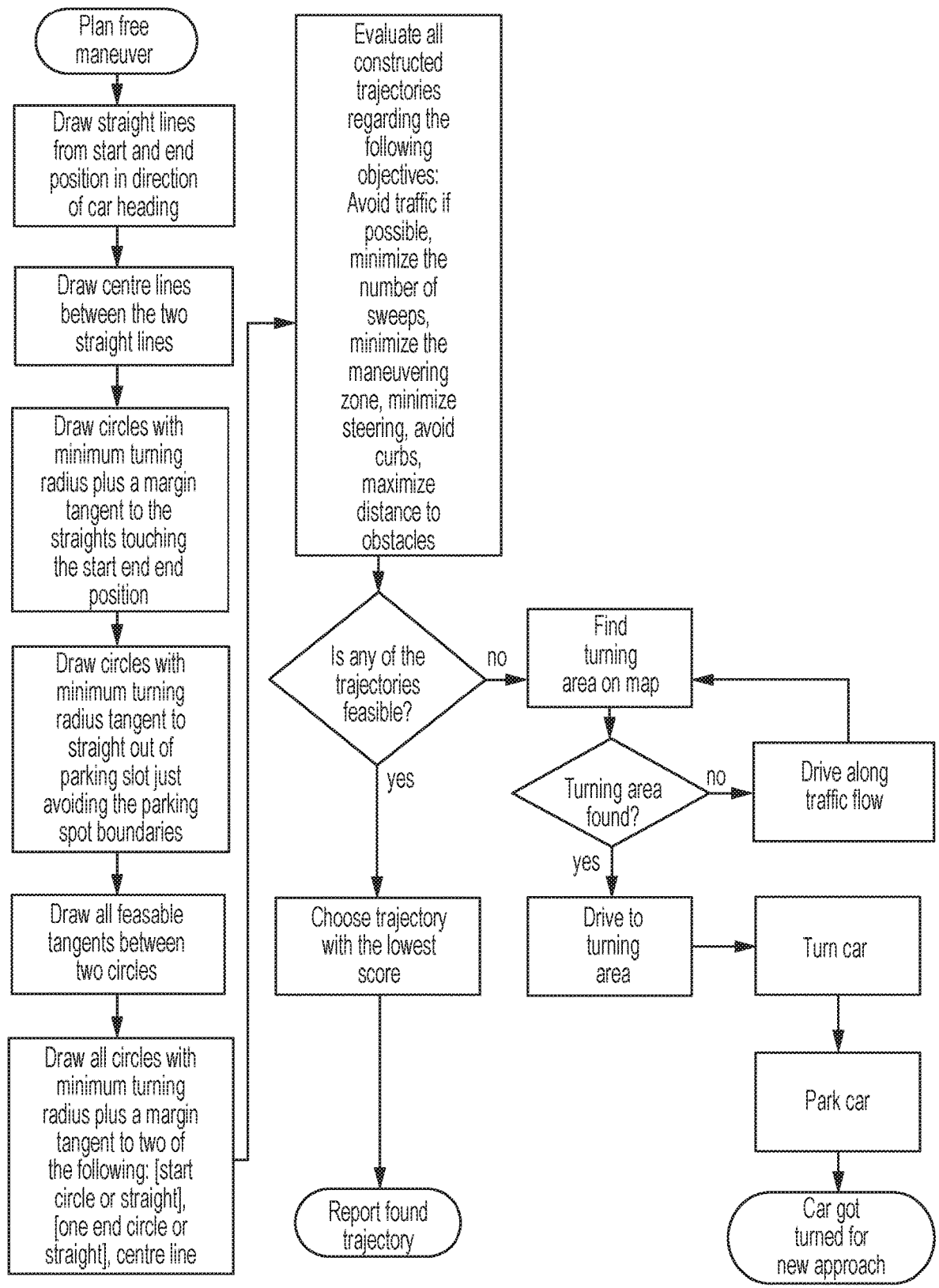
Figure 4E:
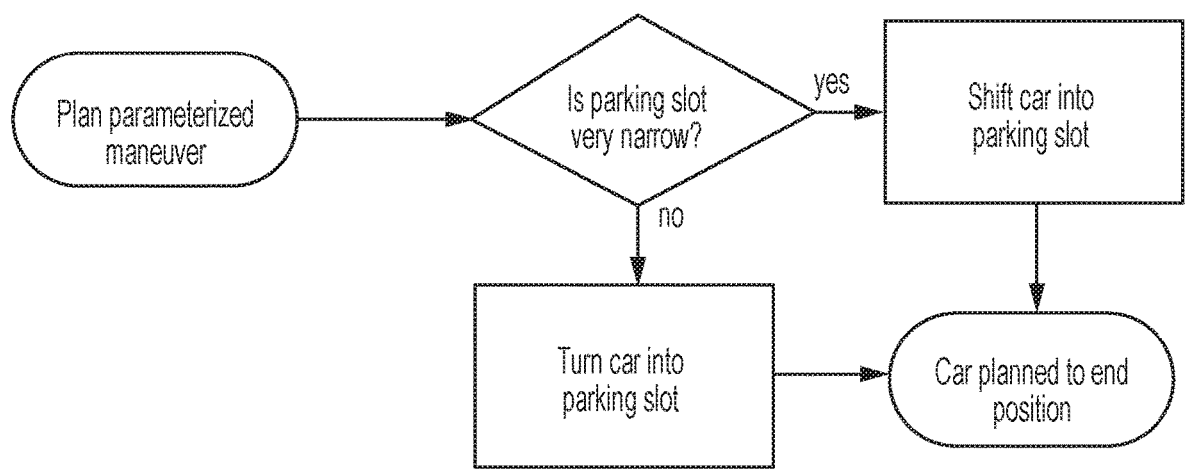
Figure 4F:
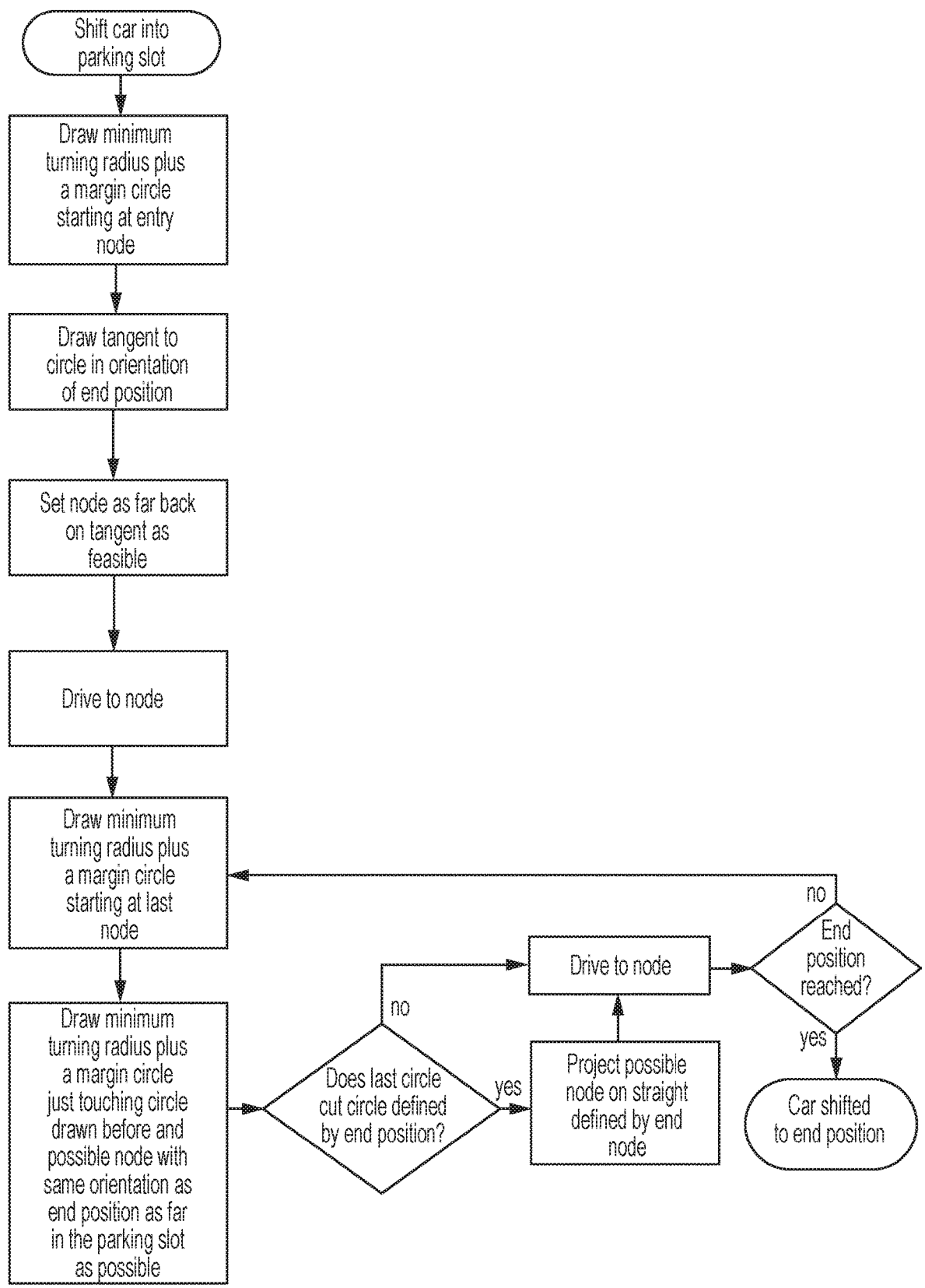
Figure 4G:
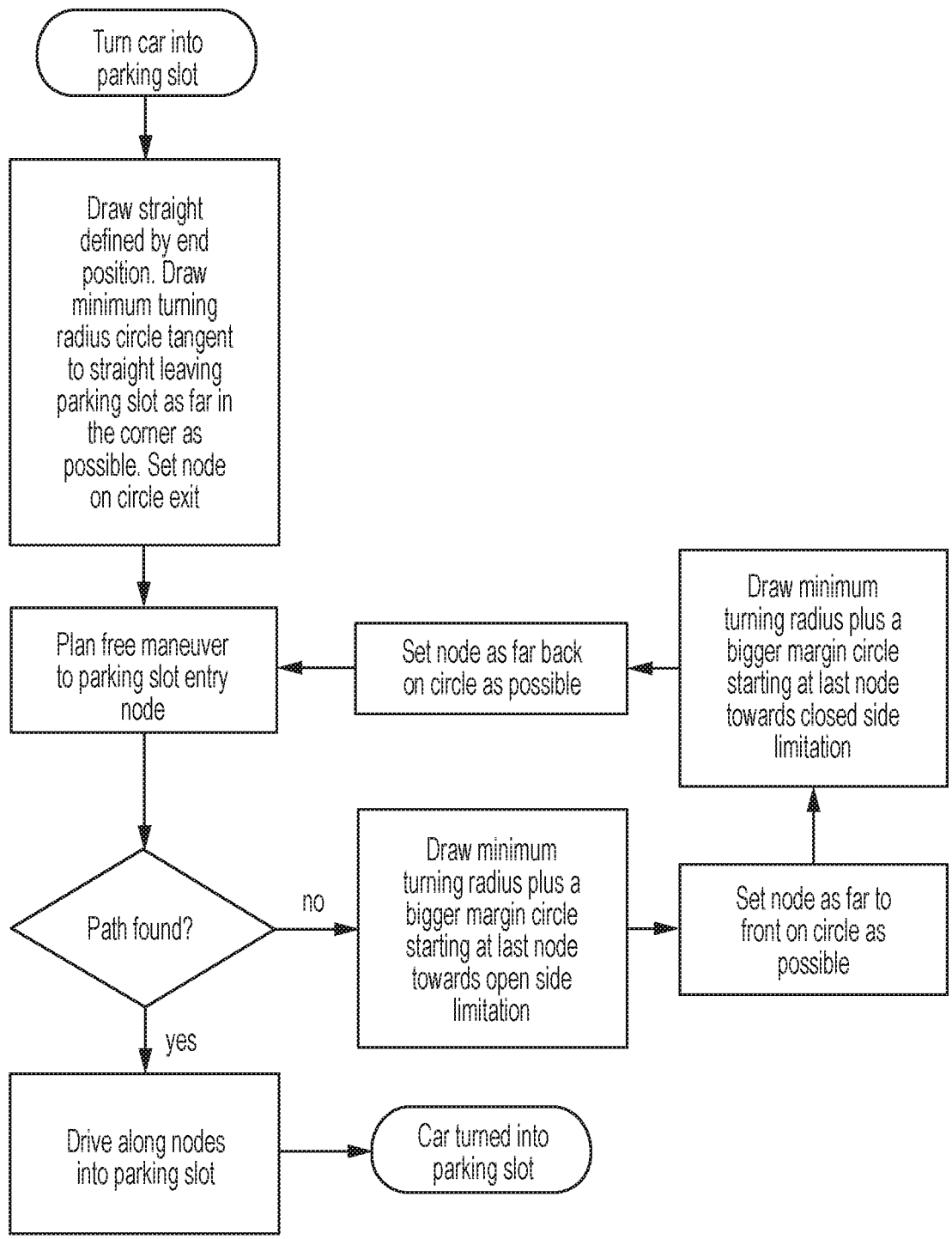
Figure 4H:
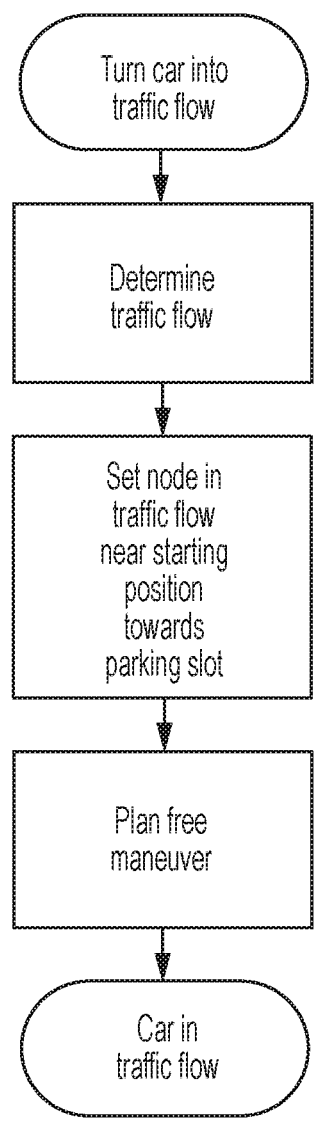
Figure 4I:
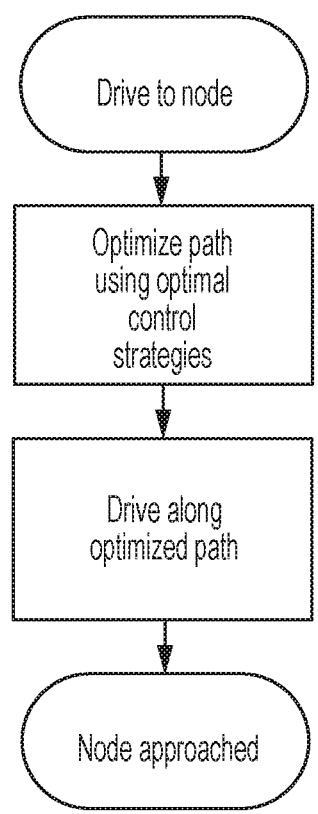

Fifth, when enterable, the general driving strategies path may be given into a OCA which task it is to smoothen the path drafted by the driving strategy planner, see FIG. 4I. The OCA will maintain the turning points (number of strokes) drafted by the strategy planner.

As soon the OCA outputs an optimized path, the ego vehicle will be able to execute the parking maneuver, see FIG. 4I, by transmitting the actual driving path to the drive controller. The drive controller may be of a type of cascade control with subordinate speed control, setpoint feedforward, and anti-reset wind up. As discussed above, the path planning procedure may be redone from time to time to adapt the planning to either driving control deviations (being derived from the planned path or speed profile), scene detection deviations (when the scene turns out to be different than earlier detections or scene data transmissions (from remote)) or path planning deviations (mistakes or errors occurred (such as, for example, quantization errors)). The path planning may be redone time triggered (such as redone as often as possible, or in a time scheme), driving distance triggered (at, for example, certain way markers such as described in U.S. provisional application Ser. No. 62/330,558, filed May 2, 2016, and U.S. Publication No. US-2016-0162747, and such as by utilizing aspects of U.S. provisional applications, Ser. No. 62/222,268, filed Sep. 23, 2015, and/or Ser. No. 62/266,734, filed Dec. 14, 2015, which are all hereby incorporated herein by reference in their entireties), threshold triggered (such as exceeding deviation threshold such of one of these mentioned above, such as, for example, when the drive control deviation may exceed a value higher in lateral driving than driving longitudinal between every way point), event triggered (such as by being reinduced from higher prioritized control) or triggered by the change of context (such as, for example, when the user may have changed a parameter setting such as taking away the limitation 'don't plan to cross or enter curbs' or the like).

Figure 8:
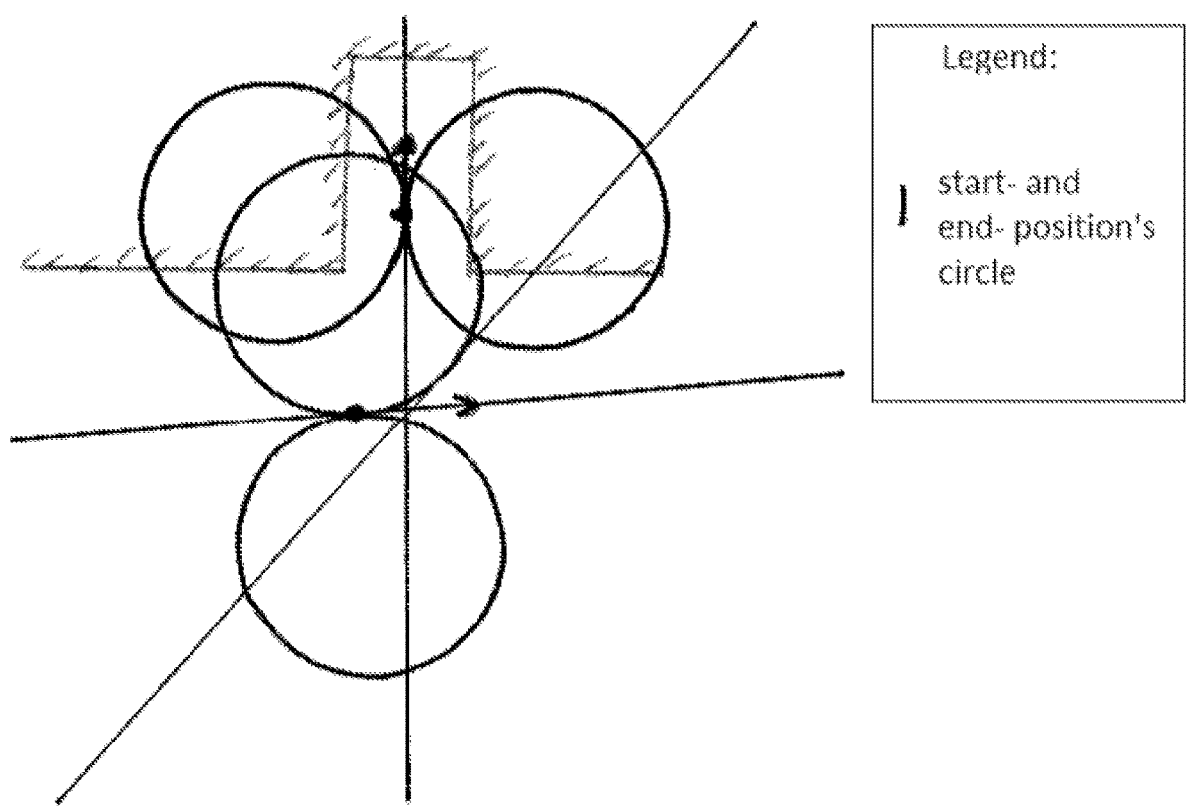
FIG. 8 shows the start end entry point (nodes) of a parking lot having both left hand and right hand minimal vehicle turning circles drawn tangent to the start end entry nodes and with both nodes having a center line drawn in direction of their heading.
Figure 9:
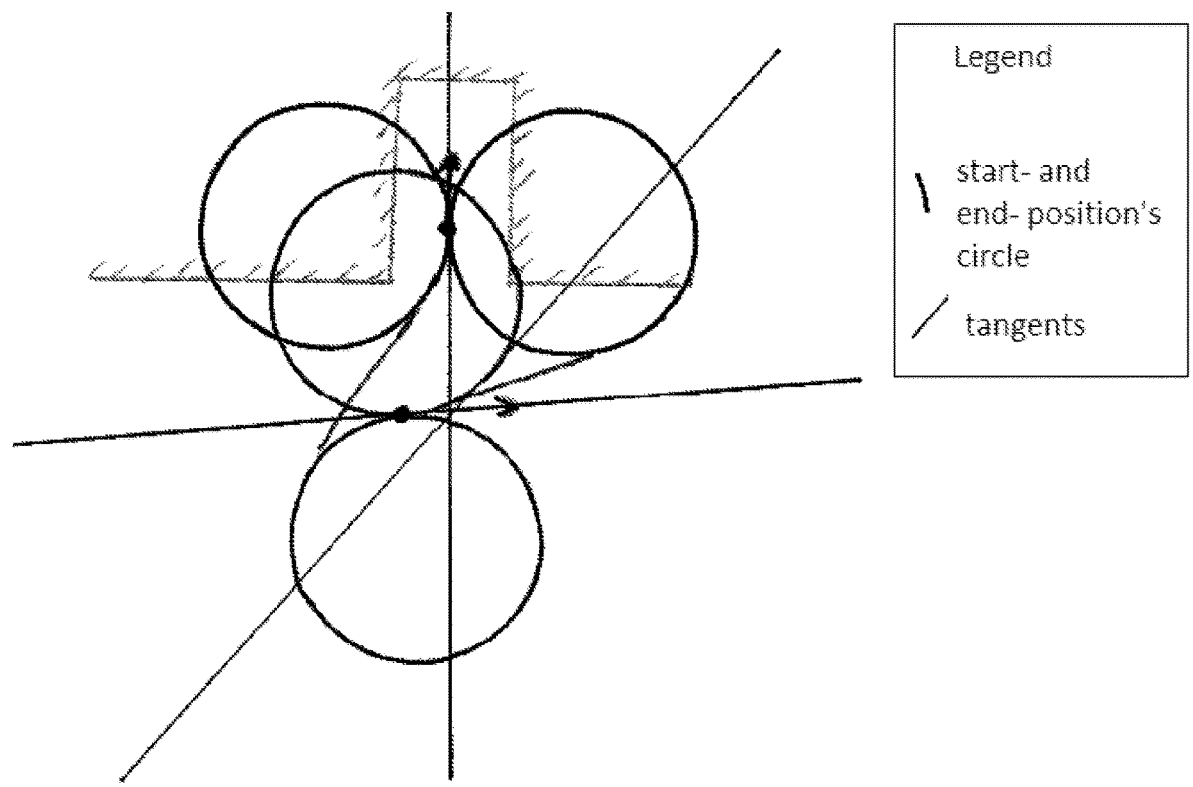
FIG. 9 shows the parking lot entry/exit path construction of FIG. 8, additionally having the tangential lines drawn from the starting nodes circles to the entry nodes circles.
Figure 10:
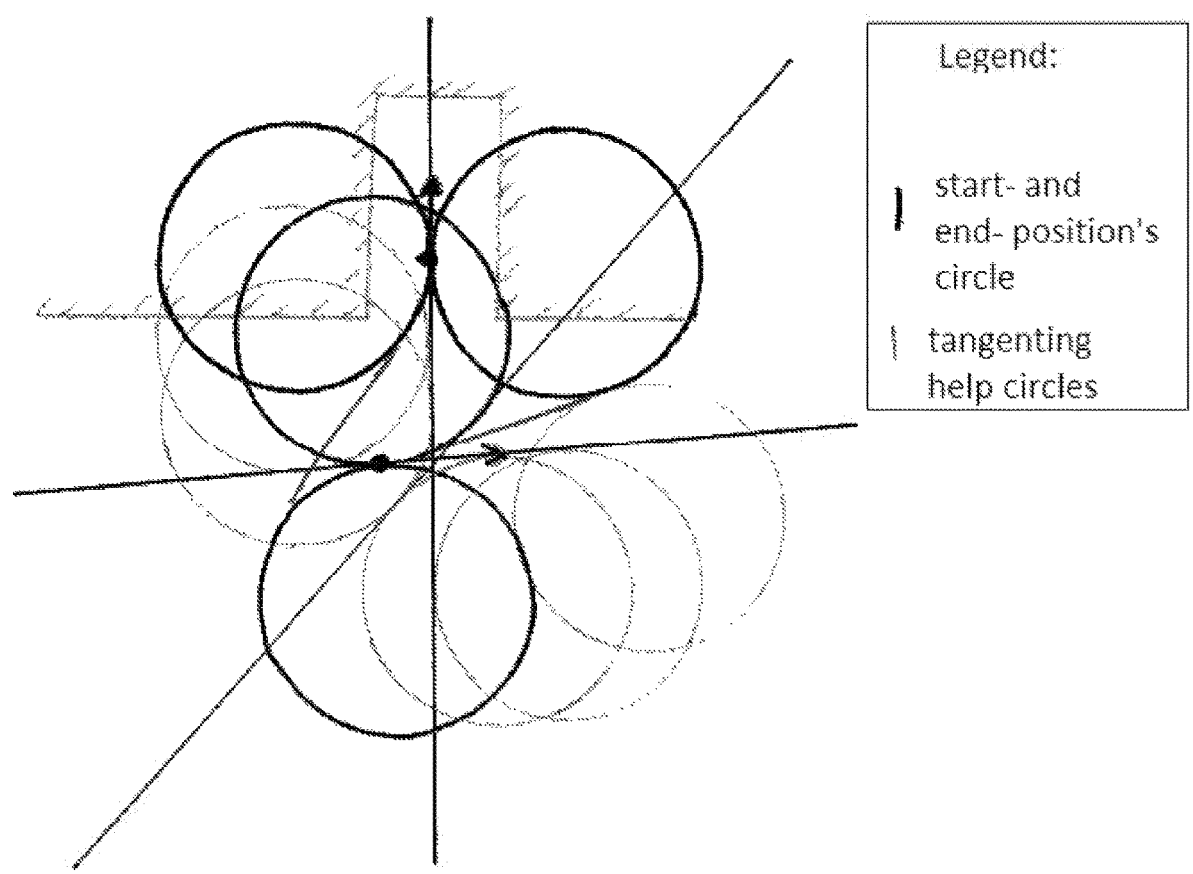
FIG. 10 shows the parking lot entry/exit path construction of FIGS. 8 and 9, showing all circles with minimum turning radius plus a margin tangent to two of the following: [start circle or straight], [one end circle or straight], and center line.

In the fourth step above, it was said that it will be required to have a general driving strategy for entering the parking spot or alternatively reaching the EP. For the following it does not matter whether the ego vehicle has narrowed towards the EP from a remote position earlier or whether it was close right from start. Such as shown in the flow chart of FIG. 4D a general parking lot entering path or a path to the EP can be geometrically constructed by the procedure described in the chart:

Draw straight lines from start and end position in direction of vehicle heading;

Draw (an angle dividing) center line between the two straight lines;

Draw circles with minimum turning radius plus a margin tangent to the straights touching the start and end position (see FIG. 8);

Draw all feasible tangents from a starting circle to an end circle (see FIG. 9);

Draw all circles with minimum turning radius plus a margin tangent to two of the following: [start circle or straight], [one end circle or straight], center line (see FIG. 10).

For choosing one preferred path out of all possible constructed paths a cost map or cost function may be used:

Evaluate all constructed trajectories regarding the following objectives;

Avoid traffic if possible, minimize the number of sweeps, minimize the maneuvering zone, minimize steering, avoid curbs, and maximize distance to obstacles (see the flow chart of FIG. 4D and the possible paths solutions A, B C and D shown in FIGS. 11A-11D). While the possible path B may be the fastest, it may be the one that requires the most space, whereas path A may require the least space. The paths C and D may be the most economic considering the objectives.

Figure 11A:
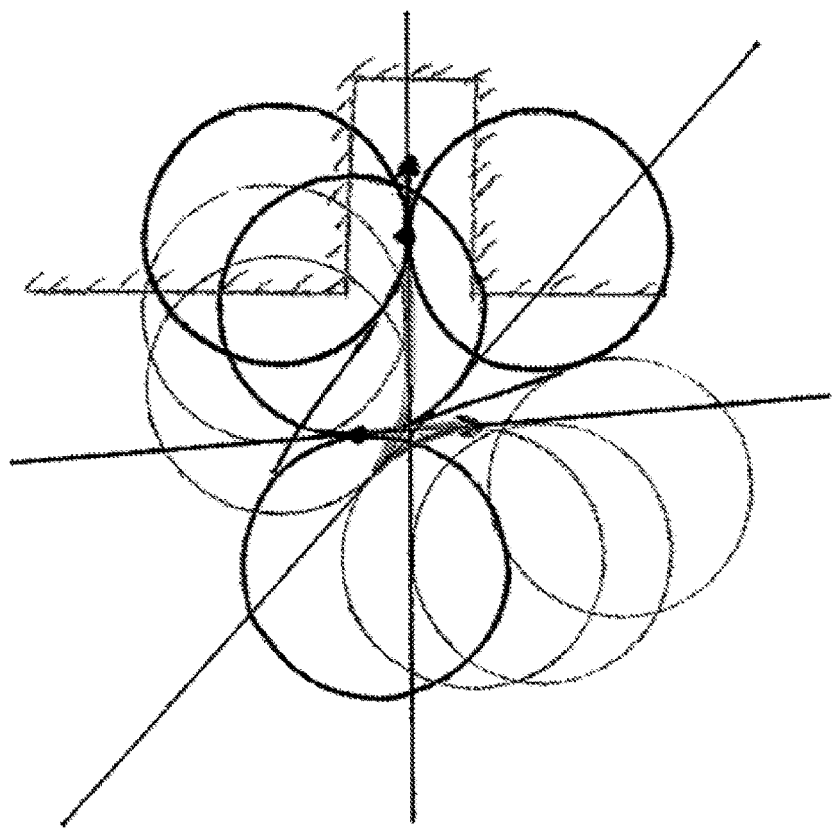
FIGS. 11A-11D are schematics showing possible paths A, B, C and D for a vehicle controlled by the automated parking assist system of the present invention.
Figure 11A:
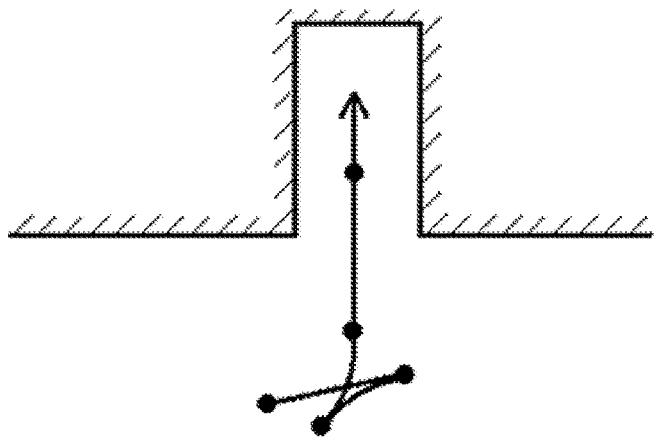
Figure 11B:
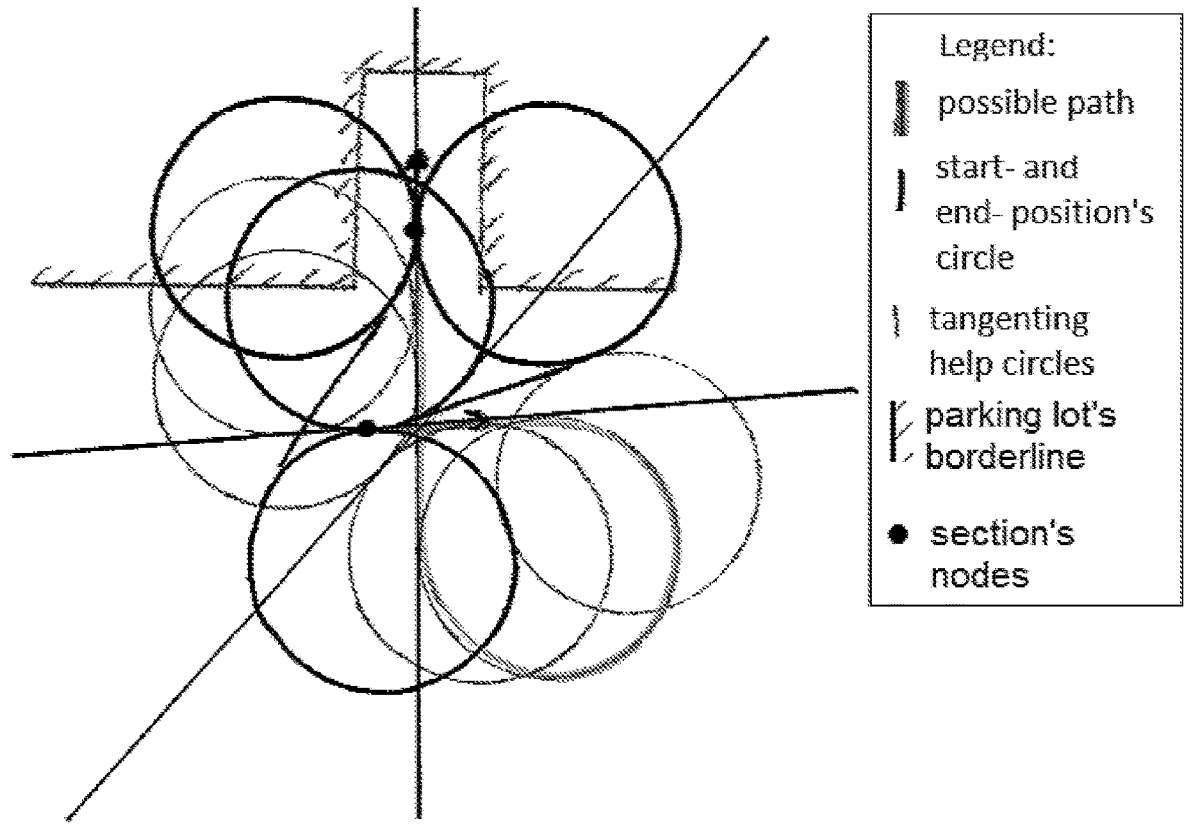
Figure 11B:
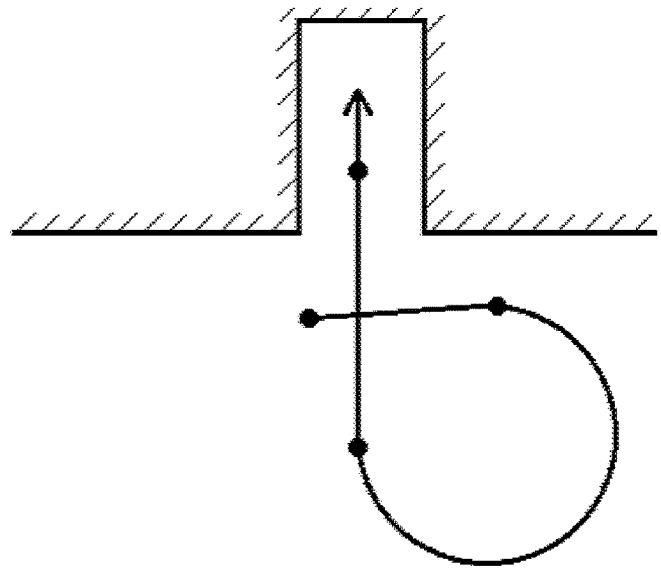
Figure 11C:
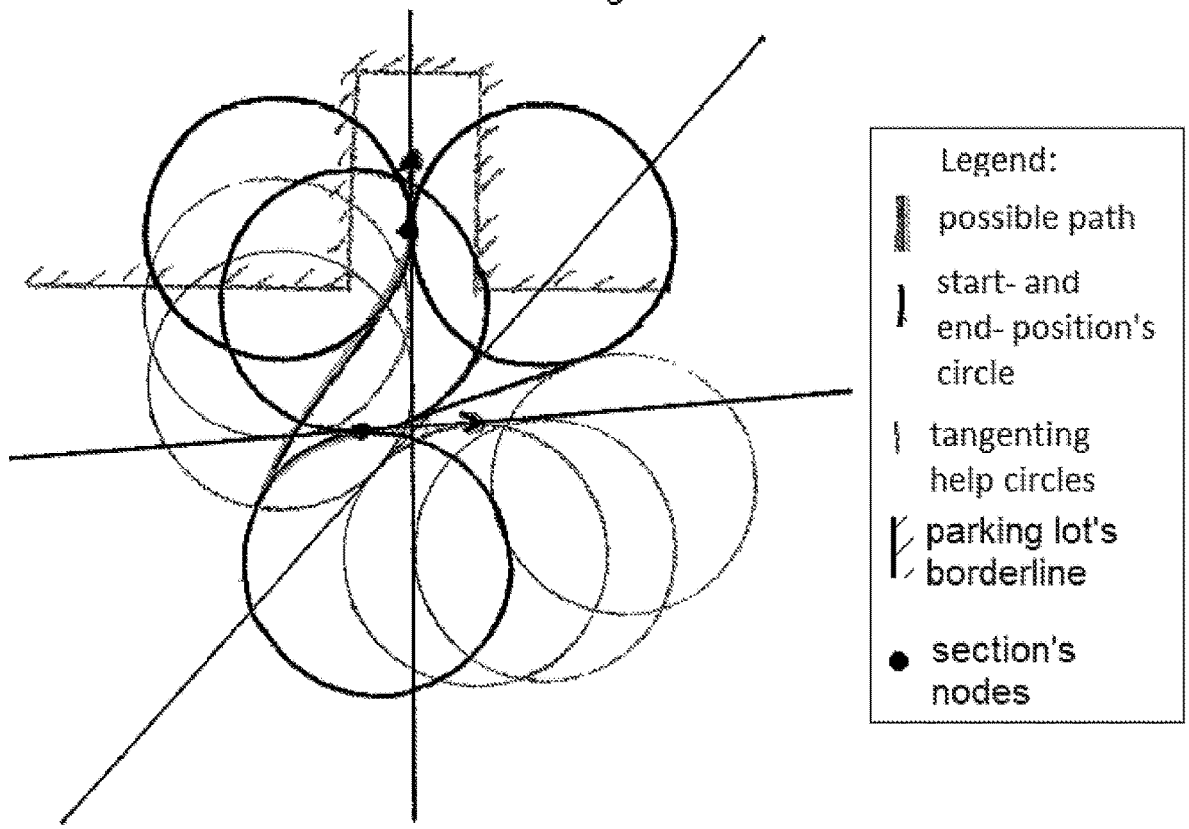
Figure 11C:
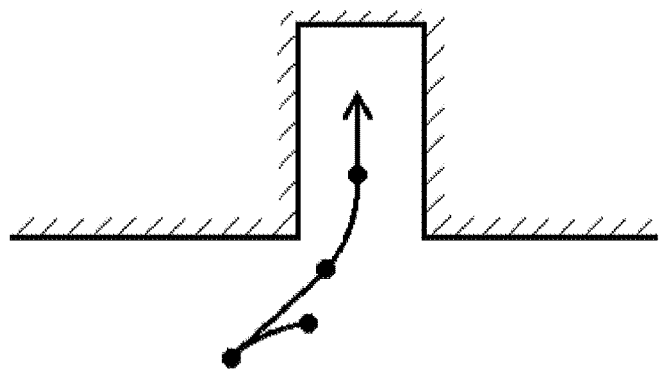
Figure 11D:
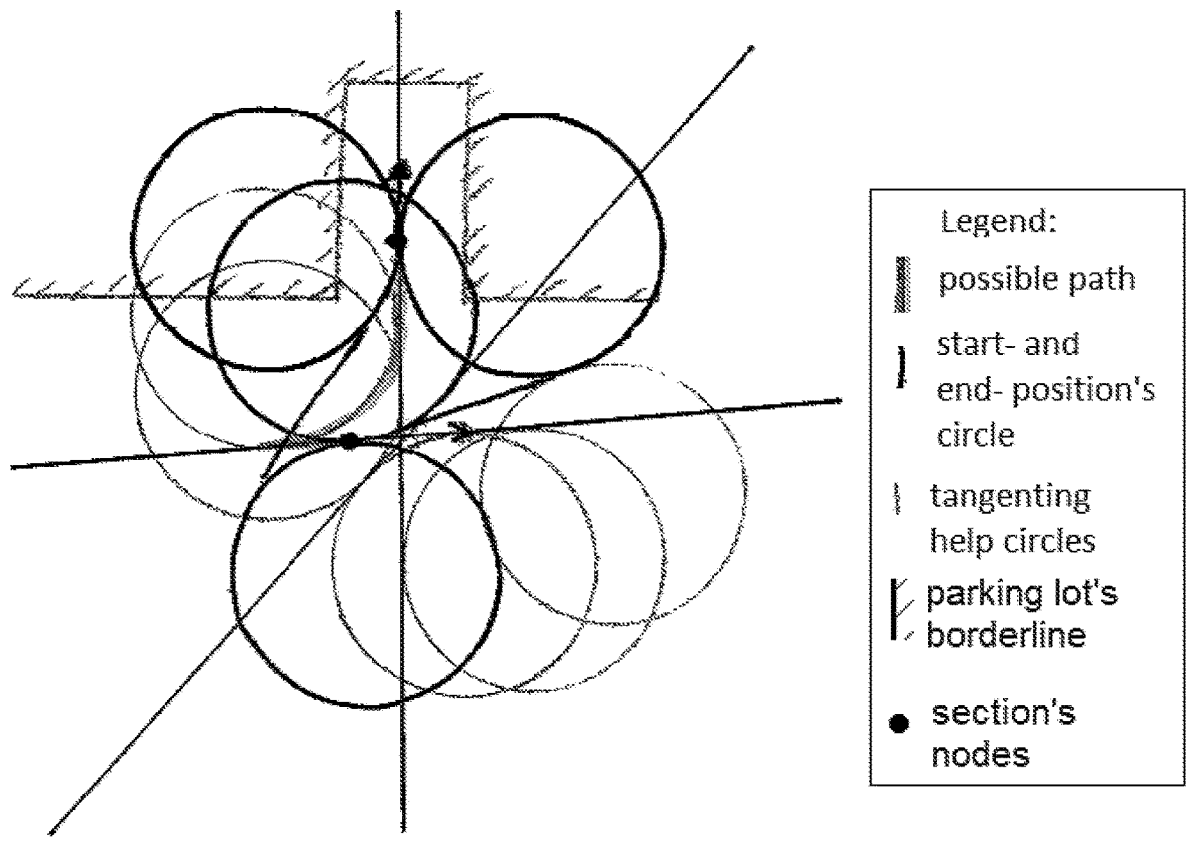
Figure 11D:
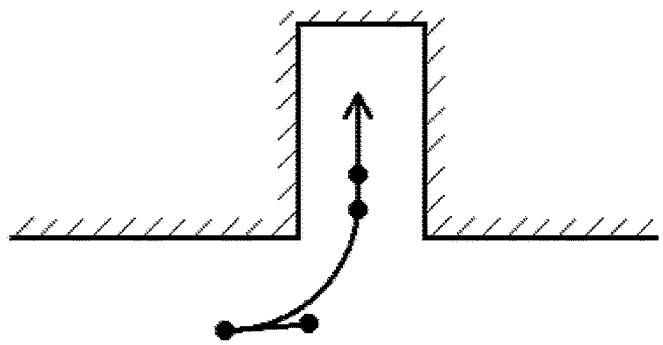
Figure 11E:
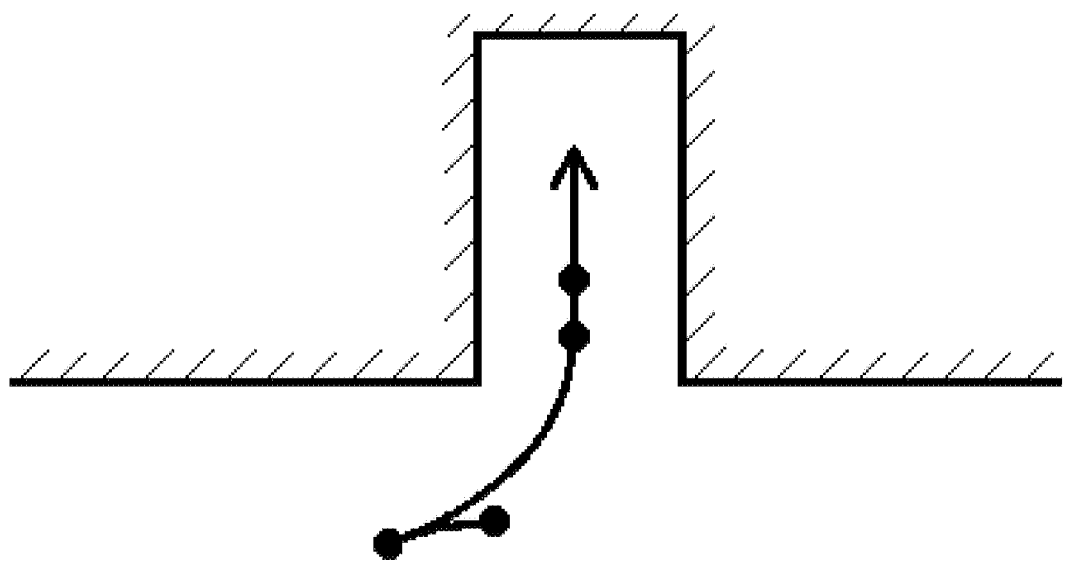
FIG. 11E shows the resulting path of processing the possible parking lot entry/exit path D from FIG. 11D via an OCA in accordance with the present invention.

In the fifth step above it was stated that an OCA may optionally be used for smoothen the prior drafted path D, such as shown in FIG. 11E. The path in FIG. 11E may be the result of optimizing the prior constructed Path D (shown in FIG. 11D) by the OCA according the invention as specified below. The resulting strokes may be neither circled nor straight. The heading at the turning direction node prior and part of the turn may be mostly identical. Preferably, the OCA may use a discrete solution method since these imply that these have finite dimensions that can be solved by a sequential quadratic programming (SQP). The methods to discretize, to structure, to reduce to form the conditions and to determine the gradients presented there may be used for the optimal control algorithm implementation of the APAS of the present invention. SQP requires a starting solution (of the general path). This is given by the prior geometrical planning done in the fourth step above. The path may be defined to the OCA by the end way points of every path section or segment (a long stroke may be segmented into smaller path segments, for being optimized single) or stroke (trajectory), called nodes $A_k$ (with $A_0$ being the start position and $A_f$ the final position) which may be defined by tuples which include beside the position X-position: x; Y-position: y also the Velocity: v; Steering angle: δ; Heading angle: ψ and the Driving direction: D, summarized in $A_k=(X_k, y_k, v_k, \delta_k, \psi_k, D_k)$.

As always in vehicle path planning from a point A to B, the drivable area (free space) (see FIG. 2) and the vehicle's kinematic abilities have to be considered, such as:

Current condition of vehicle $A_i=(x_i, y_i, v_i, \psi_i, D_i)$;
Planned condition of vehicle at next node: $A_k=(x_k, y_k, v_k, \delta_k, \psi_k, D_k)$;
Drivable area;
Dynamic capabilities of the vehicle (maximum speed and acceleration);
Capability of the steering system (maximum steering angle and steering rate);
Geometry of the vehicle (outline, steering system geometry, tire distances).

The nodes have to be set to guide the vehicle around major obstacles while still considering the drivable area and the vehicle's abilities (These nodes can also be used to define a necessary direction of travel). The OCA is capable to reflect these constraints while optimizing to (minimization-) objectives which characterize a 'good' path. These may include:

Comfort of the vehicle occupants (maximum speed, acceleration and jerk may be subject of optimization) which may correspond to minimized vehicle degrading
Time needed to finish driving, by optimizing the driving maneuver towards a fast execution (for example one should avoid to spent too much time blocking the road while maneuvering into a parking gap)
Steering in standstill should be avoided (for minimizing tire degrading), which may be done by minimizing nodes with vehicle speed equating to zero while having different input and output steering angles (the change of steering direction may be prepared before a vehicle comes to a stop at a reversing node)
Slow steering (abrupt or fast steering is considered unpleasant), by minimizing the change of steering angle between consecutive nodes, also higher harmonics may be reflected by this optimization (this will lead to smooth, elegant curves of the path)

The objectives can be expressed as a cost function (CF), additionally there are constraints and boundary conditions. By using these numerical methods not only is an optimal path found but also the parameters to control the vehicle accordingly along the path such as the acceleration ratio at the beginning and the deceleration ratio at the ending of a stroke (so that there is no overshooting). By parameterizing the CF the nature of a path can be tuned so it comes close to human driving behavior.

While this may lead to high calculation costs, these can be reduced in several ways:

The system does not need the very best path, so is can abort the optimization algorithm before finding the optimum;
By setting the nodes in a good manner the system can reduce the complexity of the task, for example it can avoid obstacles blocking most of the path;
Keeping the distance between nodes short reduces calculation complexity.

The minimization objectives named above lead to the cost functions:

Journey time: $t_f$
Steering angle: $\int_{t_0}^{t_f} \delta(t)^2 dt^2$ instead of || eases calculation
Steering rate: $\int_{t_0}^{t_f} \omega(t)^2 dt$
Steering rate (standstill):

$$\int_{t_0}^{t_f} \frac{\omega(t)^2}{v(t)^2 + v_k^2} dt$$

$V_k$: constant to avoid division by 0
Jerk: $\int_{t_0}^{t_f} j(t)^2 dt$

The cost function with tuning parameters would therefore be:

$$t_f + k_1 \int_{t_0}^{t_f} \delta(t)^2 dt + k_2 \int_{t_0}^{t_f} \omega(t)^2 dt + k_3 \int_{t_0}^{t_f} \frac{\omega(t)^2}{v(t)^2 + v_k^2} dt + k_4 \int_{t_0}^{t_f} j(t)^2 dt$$

To reduce the processing resource demand of the OCA, the processing may abort as being sufficient when a path optimization underruns a certain CF threshold. Furthermore, the input should be set as best as possible in the beginning, by that the nodes should be set in a way that the obstacle avoidance is already quite well. The path should have an as lowest complexity as possible and the distance between nodes should be short for keeping the optimizing complexity low. The OCA may find local minima only. To find the global minimum, several starting conditions should be tried. But as stated before, the system does not need to find the absolute (global) optimum but just a feasible solution is sufficient. It has not been proven yet whether the optimal control problem is always stable. But these kind of algorithms have been used successfully for path planning frequently. Especially when the OCA starts from an already semi optimized path which generally leads from one node to another.

Figure 12:
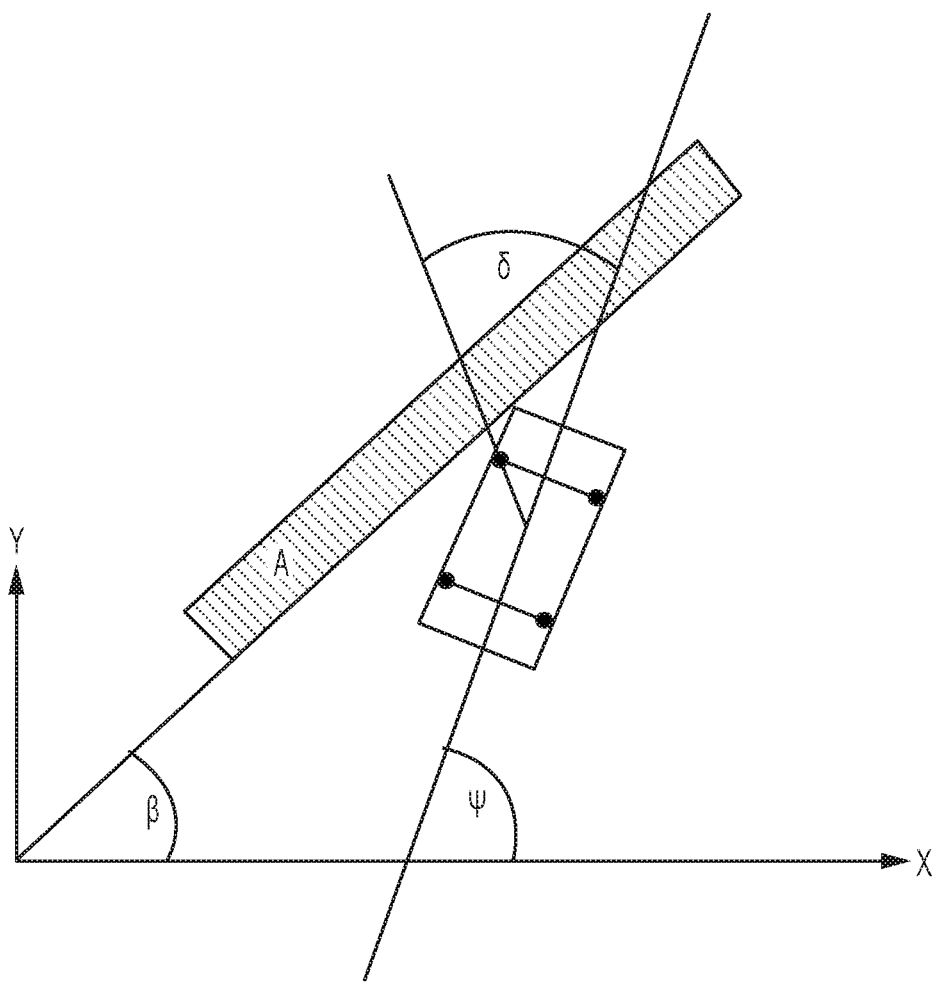
FIG. 12 is a schematic showing the angles used in the equations used in determining how a vehicle controlled by the automated parking assist system of the present invention may be controlled when a curb is present.
Figure 13A:
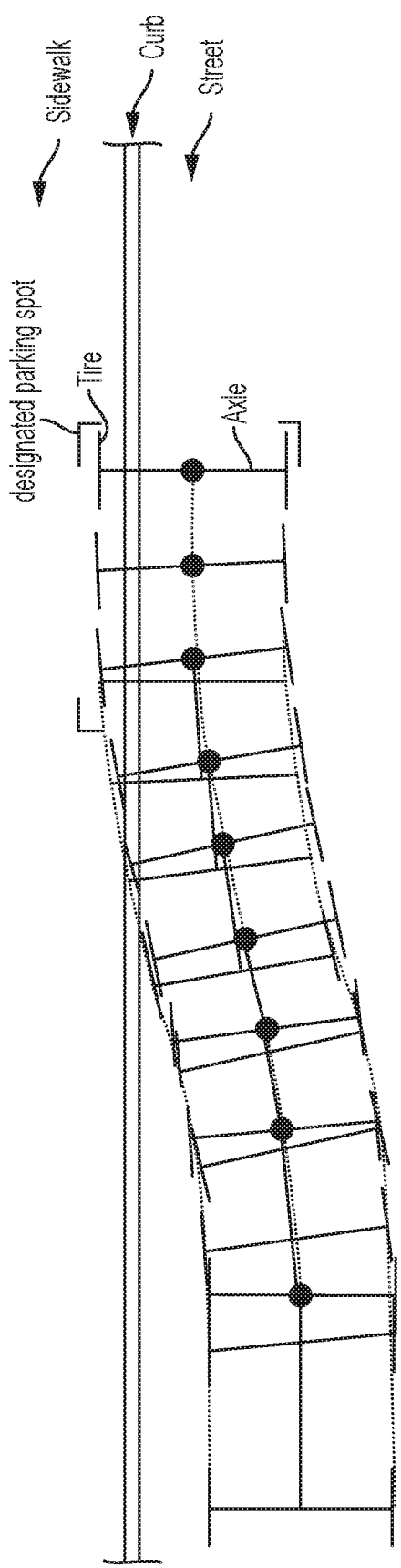
FIG. 13A shows the determined path from the starting point to a desired parking spot before optimizing the path for entering curbs, shown with the vehicle backing up.
Figure 13B:
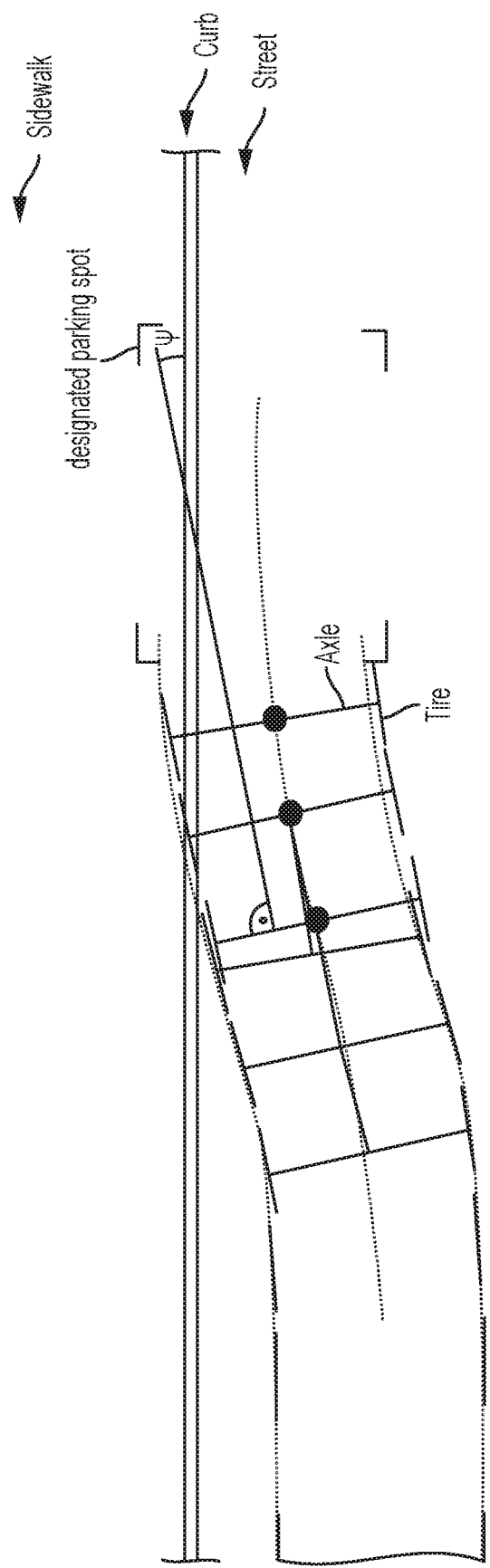
FIG. 13B shows there is a sharp angle $\psi$ of the rear right tire of a vehicle before optimizing (section of the path in FIG. 13A)
Figure 13C:
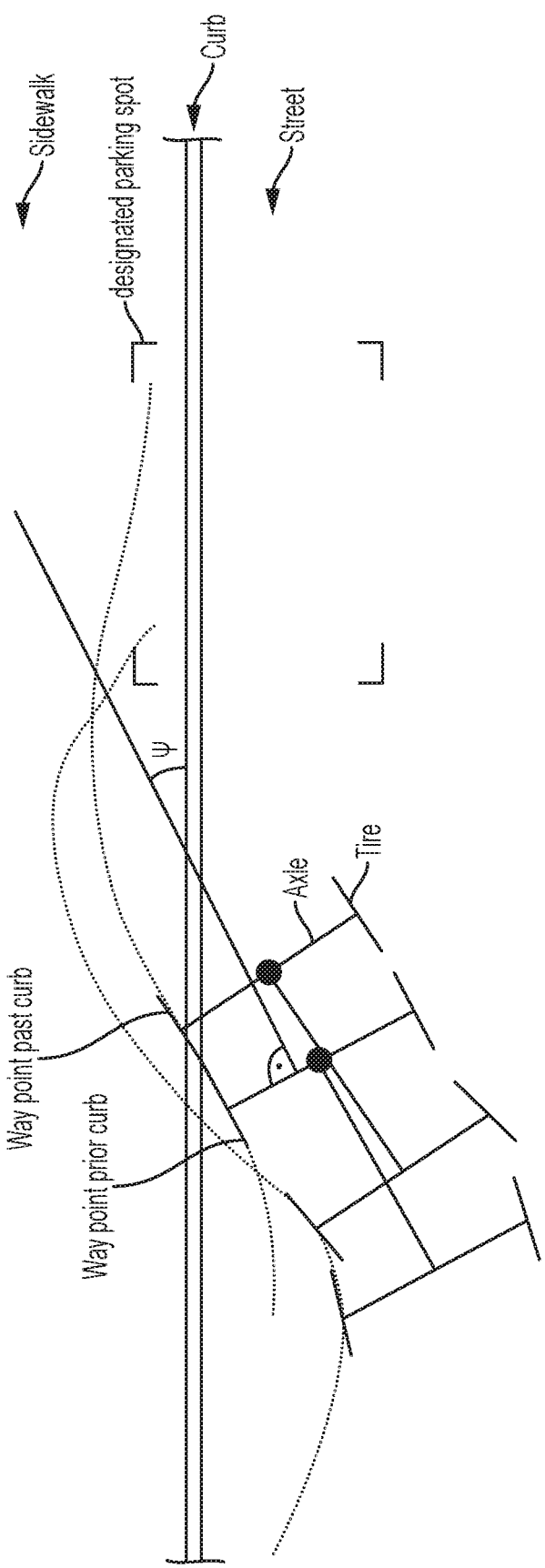
FIG. 13C shows that the angle $\psi$ has increased by setting a way point in short before the curb and one short behind for optimizing (section of the path in FIG. 13D) for the rear tire to enter the curb.
Figure 13D:
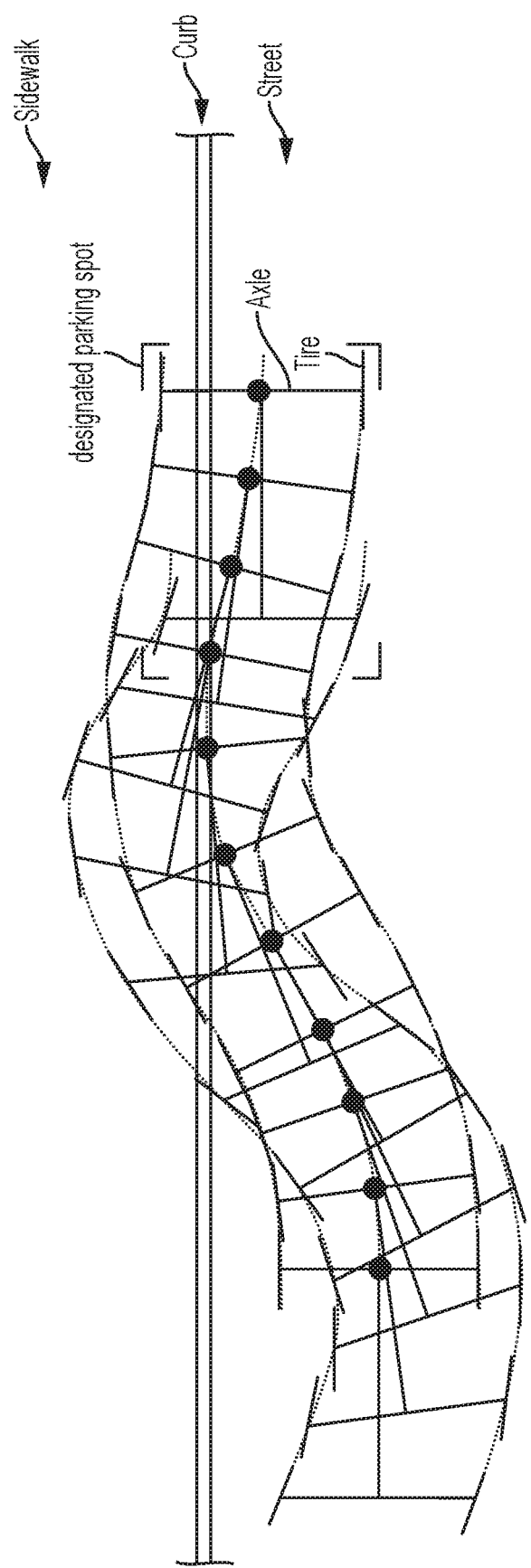
FIG. 13D shows the entering path of parking spot optimized for overcoming the curb.

As implementation of a slightly more advanced APAS according to the present invention, the system may optionally be able to solve special path planning tasks given by certain additional constrains: for example, for entering a curb (half way or with the full extension of the vehicle) of a substantial height it is to desire that the path of every involved vehicle wheel is above a certain angle α uncritically to damage the tire or the rim, see FIG. 12. To address this restraint, the APAS of the invention has to add two extra nodes into the planned park space entering path, one short before the specific wheel is entering the curb one short behind which lead to a stump angle across the curb. This measure may lead to slight altering of the outcome of the driving strategy (see examples of FIG. 13A before and FIG. 13D after optimizing the path for entering a curb). The examples of FIGS. 13B and 13C show the angle of the rear tire in example. The optimization is also done for the front tire using the optimized path of FIG. 13D). It may happen that additional strokes are required to enter a parking slot. As an alternative implementation for entering curbs on a stump angle always the angle constraint may not be implemented by setting two close nodes close to the curb but by adding a boundary condition as additional input to the minimization task when invoking the OCA starting on a prior geometrically drafted path (as usual) without having the curb angle constrain reflected during that drafting.

$$|\delta+\psi-\beta|>\alpha f \text{ or } P(x,y)\in A;$$

with $\alpha$ being the threshold for entering the curb, which has an angle $\beta$ to the base system, $\psi$ is the heading angle of the vehicle to the curb, and $\delta$ is the vehicle's steering angle.

Optionally, the speed profile may also be optimized for overcoming a curb. The initial speed may be chosen in a way that the kinetic energy of the moving vehicle is slightly above the required energy for lifting the vehicle over the curb's slope.

Figure 14:
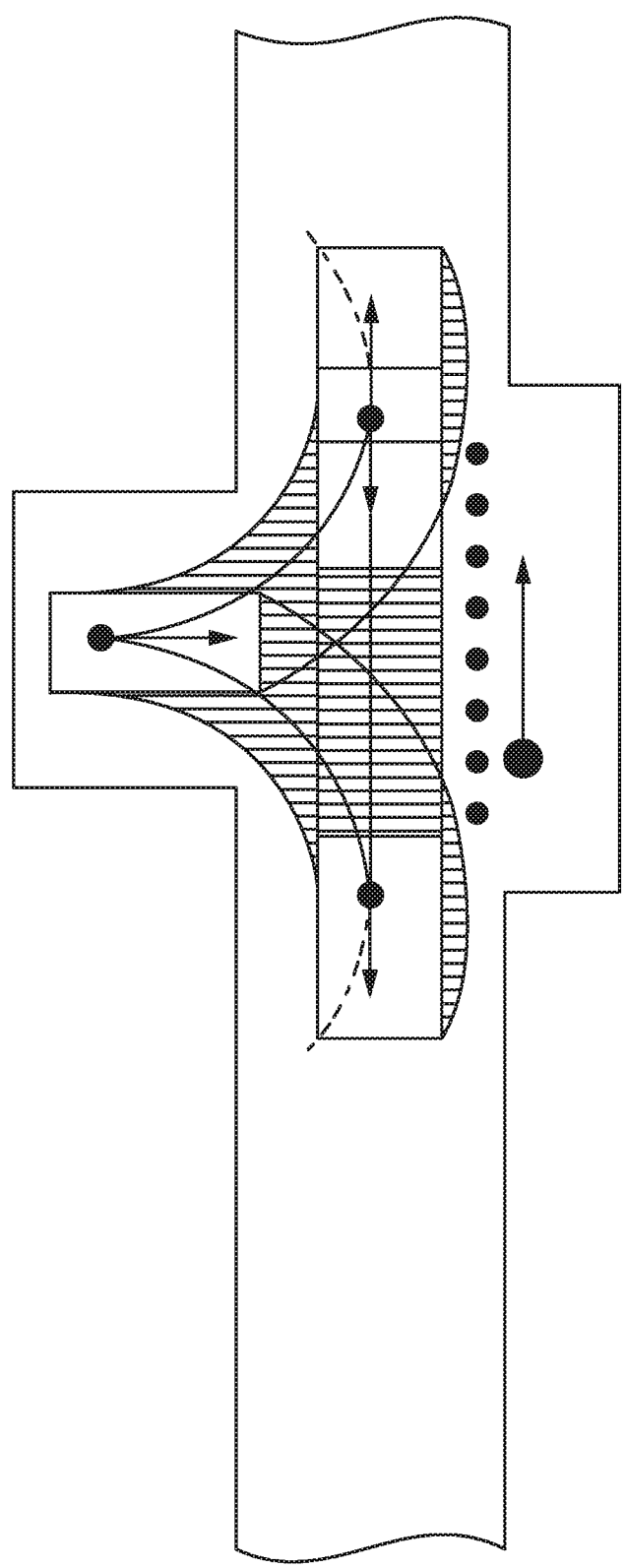
FIGS. 14 and 15 are schematics showing how a vehicle controlled by the automated parking assist system of the present invention may be reversed.
Figure 15:
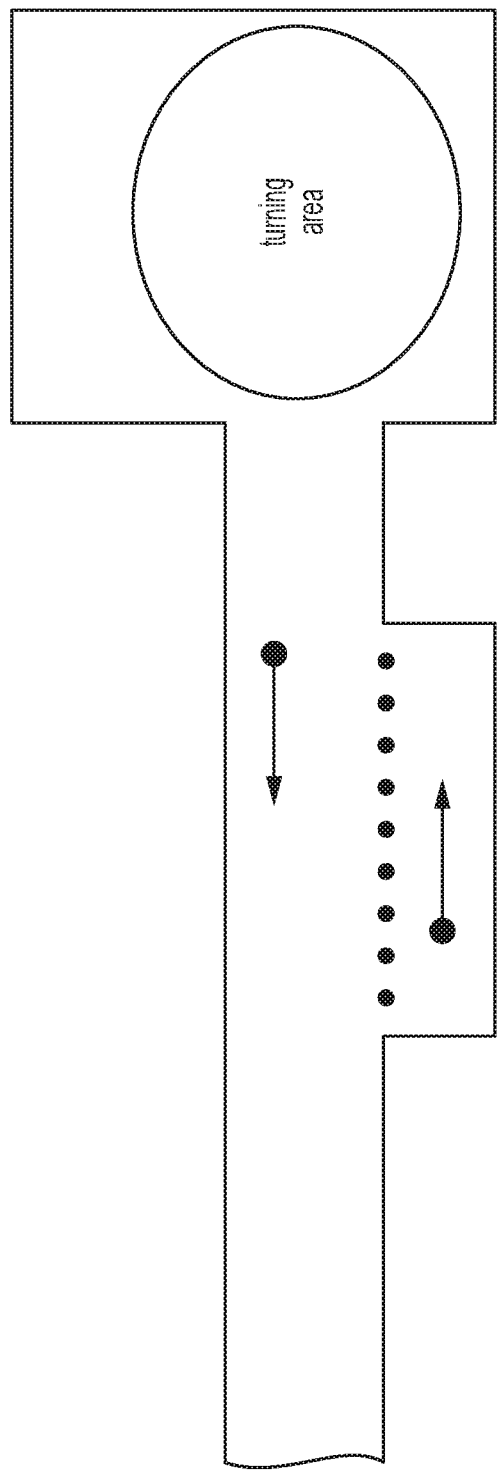

The APAS of the present invention may typically have the task to enter a specific parking lot with a specific heading out of a position with a given heading. In FIG. 7, templates for turning around were presented. The algorithm of the APAS system of the present invention may check whether one of the turning around templates—'patches' may fit into the given free space, see FIG. 14. In some of these cases the turning around for entering the specific parking lot at a different heading as the vehicle is actually in is not possible due to the drivable space is to narrow. In such situations, it may be decided that the vehicle is driving towards an area large enough for turning, for coming back in another heading direction, see FIG. 15.

Thus, the present invention provides a parking assist system that determines a path for the vehicle to follow from a current or initial location to a parked location at a selected or target parking space. The parking assist system determines the path by selecting from possible paths available to the controlled vehicle, with the possible paths being determined in accordance with the turning capabilities of the vehicle and other parameters. The system adjusts the path as the vehicle moves along the initial path and as more details are obtained via the sensors of the vehicle (such as exterior viewing cameras or TOF sensors or RADAR sensors or LIDAR sensors or the like). The parking assist system of the present invention may utilize aspects of the systems described in U.S. Pat. No. 8,874,317 and/or U.S. Publication Nos. US-2015-0344028; US-2015-0251599; US-2015-0158499; US-2015-0124096 and/or US-2014-0375476, which are all hereby incorporated herein by reference in their entireties.

The parking assist system of the present invention thus may initially conduct an environment detection using its sensors, and then may conduct a context analysis to determine which free spaces may be parking spots. The system may then approximate a path towards an entry node of a chosen parking spot using circled and straight path sections. The system then is operable to smooth the path of travel of the vehicle, which equates to making it more comfortable for the passenger by employing an optimal control algorithm (OCA) under use of a cost function (minimization function). The OCA works best when the entry is already plausible (so the path or section of a path from start to end already works but is improvable), and then optimizes the path via the given objectives and regarding the given constraints. Since the error in primarily scene detection is comparably high and the resolution is often quite low, just the general path should be planned, but not optimized significantly. The to-be-driven next path section in the near field of the sensors (high resolution, low error, real time) should be subject of optimization by the OCA.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610;

6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661; WO 2013/158592 and/or WO 2014/204794, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication Nos. US-2010-0097469 and/or US-2006-0061008, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device utilizing aspects of the display systems described in U.S. Pat. Nos. 7,370,983; 7,329,013; 7,308,341; 7,289,037; 7,249,860; 7,004,593; 6,690,268; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for automated parking of a vehicle, the method comprising:

equipping a vehicle with at least one vision sensor;

capturing image data via the at least one vision sensor while the vehicle is being driven;

equipping the vehicle with an electronic control unit (ECU), the ECU comprising an image processor;

providing image data captured by the at least one vision sensor to the ECU;

providing a parking scene map to the ECU;

selecting, via processing of the parking scene map at the ECU, a free parking space present in the parking scene map as a target parking space;

formulating a parking path from a current vehicle location to the target parking space;

autonomously maneuvering the vehicle along the parking path towards the target parking space;

processing image data captured by the at least one vision sensor as the vehicle is autonomously maneuvered along the parking path;

determining a change in the parking scene map as the vehicle is autonomously maneuvered along the parking path;

reformulating the parking path responsive to the determined change in the parking scene map;

detecting, via processing at the ECU of image data captured by the at least one vision sensor, any pedestrians in the target parking space or along the parking path;

responsive to detection of a pedestrian in the target parking space or along the parking path, stopping the vehicle until the detected pedestrian moves out of the target parking space or out of the parking path;

determining, via processing at the ECU of image data captured by the at least one vision sensor, that the detected pedestrian has moved out of the target parking space or out of the parking path; and after the detected pedestrian has moved out of the target parking space or out of the parking path, continuing autonomous maneuvering of the vehicle along the parking path towards the target parking space.

2. The method of claim 1, wherein providing the parking scene map is at least in part responsive to processing at the ECU of image data captured by the at least one vision sensor as the vehicle is being driven.

3. The method of claim 1, wherein reformulating the parking path is at least in part responsive to processing at the ECU of image data captured by the at least one vision sensor as the vehicle is autonomously maneuvered along the parking path.

4. The method of claim 1, wherein providing the parking scene map comprises providing height information of objects present in the parking scene map.

5. The method of claim 1, wherein providing the parking scene map comprises providing labels indicative of objects present in the parking scene map.

6. The method of claim 1, comprising controlling steering, braking and acceleration of the vehicle to autonomously maneuver the vehicle along the parking path.

7. The method of claim 1, wherein processing at the ECU of image data captured by the at least one vision sensor as the vehicle is autonomously maneuvered along the parking path at least in part determines the change in the parking scene map as the vehicle is autonomously maneuvered along the parking path.

8. The method of claim 1, wherein reformulating the parking path is responsive to determination that a free parking space changes to an occupied space.

9. The method of claim 1, wherein the parking scene map comprises at least one non-drivable space.

10. The method of claim 1, wherein the parking scene map comprises at least one supposedly free parking space.

11. The method of claim 1, wherein the parking scene map comprises at least one supposedly non-drivable spaces.

12. The method of claim 1, wherein the parking scene map comprises a scene map of a parking lot.

13. The method of claim 1, wherein the parking scene map comprises a scene map of parking slots along a road being traveled by the vehicle.

14. The method of claim 1, wherein providing the parking scene map comprises providing terrain information of areas in the parking scene map.

15. The method of claim 14, wherein providing the parking scene map comprises providing labels indicative of terrain at areas in the parking scene map.

16. The method of claim 1, wherein formulating the parking path comprises formulating a plurality of possible parking paths and selecting the parking path therefrom.

17. The method of claim 16, wherein selecting the parking path from the plurality of possible parking paths comprises selecting the parking path based on one or more selected from the group consisting of (i) avoiding traffic as the vehicle is autonomously maneuvered along the parking path, (ii) minimizing a number of turns of the vehicle as the vehicle is autonomously maneuvered along the parking path, (iii) minimizing an area required for autonomously maneuvering the vehicle along the parking path, (iv) avoiding curbs as the vehicle is autonomously maneuvered along the parking path, and (v) avoiding objects as the vehicle is autonomously maneuvered along the parking path.

18. The method of claim 1, wherein the parking scene map is at least in part wirelessly provided to the ECU from a remote source.

19. The method of claim 18, wherein the remote source comprises a parking lot management system.

20. The method of claim 1, wherein the parking scene map comprises at least one drivable free space.

21. The method of claim 20, wherein reformulating the parking path is responsive to determination that a drivable free space of the parking scene map that is along the parking path changes to a non-drivable space.

22. The method of claim 1, wherein the at least one vision sensor comprises a forward-viewing camera mounted at an in-cabin side of a windshield of the vehicle, the forward-viewing camera viewing forward of the vehicle through the windshield.

23. The method of claim 22, wherein the forward-viewing camera comprises a photosensor array having at least one million photosensor elements.

24. A method for automated parking of a vehicle, the method comprising:

equipping a vehicle with at least one vision sensor;

wherein the at least one vision sensor comprises a forward-viewing camera mounted at an in-cabin side of a windshield of the vehicle, the forward-viewing camera viewing forward of the vehicle through the windshield, and wherein the forward-viewing camera comprises a photosensor array having at least one million photosensor elements;

capturing image data via the forward-viewing camera while the vehicle is being driven;

equipping the vehicle with an electronic control unit (ECU), the ECU comprising an image processor;

providing image data captured by the forward-viewing camera to the ECU;

providing a parking scene map to the ECU;

selecting, via processing of the parking scene map at the ECU, a free parking space present in the parking scene map as a target parking space;

formulating a parking path from a current vehicle location to the target parking space;

controlling steering, braking and acceleration of the vehicle to autonomously maneuver the vehicle along the parking path towards the target parking space;

processing image data captured by the forward-viewing camera as the vehicle is autonomously maneuvered along the parking path;

determining a change in the parking scene map as the vehicle is autonomously maneuvered along the parking path;

reformulating the parking path responsive to the determined change in the parking scene map;

detecting, via processing at the ECU of image data captured by forward-viewing camera, any pedestrians in the target parking space or along the parking path;

responsive to detection of a pedestrian in the target parking space or along the parking path, stopping the vehicle until the detected pedestrian moves out of the target parking space or out of the parking path;

determining, via processing at the ECU of image data captured by the forward-viewing camera, that the detected pedestrian has moved out of the target parking space or out of the parking path; and after the detected pedestrian has moved out of the target parking space or out of the parking path, continuing autonomous maneuvering of the vehicle along the parking path towards the target parking space.

25. The method of claim 24, wherein providing the parking scene map is at least in part responsive to processing at the ECU of image data captured by the forward-viewing camera as the vehicle is being driven.

26. The method of claim 24, wherein providing the parking scene map comprises providing at least one selected from the group consisting of (i) height information of objects present in the parking scene map and (ii) terrain information of areas in the parking scene map.

27. The method of claim 24, wherein the parking scene map comprises at least one drivable free space, and wherein reformulating the parking path is responsive to determination that a drivable free space of the parking scene map that is along the parking path changes to a non-drivable space.

28. The method of claim 24, wherein the forward-viewing camera comprises a photosensor array having at least one million photosensor elements.

29. The method of claim 24, wherein the parking scene map is at least in part wirelessly provided to the ECU from a remote source, and wherein the remote source comprises a parking lot management system.

30. The method of claim 28, comprising controlling steering, braking and acceleration of the vehicle to autonomously maneuver the vehicle along the parking path.

31. The method of claim 30, wherein reformulating the parking path is at least in part responsive to processing at the ECU of image data captured by the forward-viewing camera as the vehicle is autonomously maneuvered along the parking path.

32. The method of claim 24, wherein formulating the parking path comprises formulating a plurality of possible parking paths and selecting the parking path therefrom.

33. The method of claim 32, wherein selecting the parking path from the plurality of possible parking paths comprises selecting the parking path based on one or more selected from the group consisting of (i) avoiding traffic as the vehicle is autonomously maneuvered along the parking path, (ii) minimizing a number of turns of the vehicle as the vehicle is autonomously maneuvered along the parking path, (iii) minimizing an area required for autonomously maneuvering the vehicle along the parking path, (iv) avoiding curbs as the vehicle is autonomously maneuvered along the parking path, and (v) avoiding objects as the vehicle is autonomously maneuvered along the parking path.

34. A method for automated parking of a vehicle, the method comprising:

equipping a vehicle with at least one vision sensor;

wherein the at least one vision sensor comprises a forward-viewing camera mounted at an in-cabin side of a windshield of the vehicle, the forward-viewing camera viewing forward of the vehicle through the windshield;

capturing image data via the forward-viewing camera while the vehicle is being driven;

equipping the vehicle with an electronic control unit (ECU), the ECU comprising an image processor;

providing image data captured by the forward-viewing camera to the ECU;

providing a parking scene map to the ECU, wherein the parking scene map is at least in part wirelessly provided to the ECU from a remote source;

selecting, via processing of the parking scene map at the ECU, a free parking space present in the parking scene map as a target parking space;

formulating a parking path from a current vehicle location to the target parking space;

autonomously maneuvering the vehicle along the parking path towards the target parking space;

processing image data captured by the forward-viewing camera as the vehicle is autonomously maneuvered along the parking path;

detecting, via processing at the ECU of image data captured by the forward-viewing camera, any pedestrians in the target parking space or along the parking path;

responsive to detection of a pedestrian in the target parking space or along the parking path, stopping the vehicle until the detected pedestrian moves out of the target parking space or out of the parking path;

determining, via processing at the ECU of image data captured by the forward-viewing camera, that the detected pedestrian has moved out of the target parking space or out of the parking path; and after the detected pedestrian has moved out of the target parking space or out of the parking path, continuing autonomous maneuvering of the vehicle along the parking path towards the target parking space.

35. The method of claim 34, wherein formulating the parking path comprises formulating a plurality of possible parking paths and selecting the parking path therefrom, and wherein selecting the parking path from the plurality of possible parking paths comprises selecting the parking path based on one or more selected from the group consisting of (i) avoiding traffic as the vehicle is autonomously maneuvered along the parking path, (ii) minimizing a number of turns of the vehicle as the vehicle is autonomously maneuvered along the parking path, (iii) minimizing an area required for autonomously maneuvering the vehicle along the parking path, (iv) avoiding curbs as the vehicle is autonomously maneuvered along the parking path, and (v) avoiding objects as the vehicle is autonomously maneuvered along the parking path.

36. The method of claim 34, wherein the forward-viewing camera comprises a photosensor array having at least one million photosensor elements.

37. The method of claim 36, wherein the remote source comprises a parking lot management system.

38. The method of claim 36, comprising controlling steering, braking and acceleration of the vehicle to autonomously maneuver the vehicle along the parking path.

39. The method of claim 34, comprising determining a change in the parking scene map as the vehicle is autonomously maneuvered along the parking path, and further comprising reformulating the parking path responsive to the determined change in the parking scene map.

40. The method of claim 39, wherein reformulating the parking path is at least in part responsive to processing at the ECU of image data captured by the forward-viewing camera as the vehicle is autonomously maneuvered along the parking path.

41. The method of claim 39, wherein the parking scene map comprises at least one drivable free space, and wherein reformulating the parking path is responsive to determination that a drivable free space of the parking scene map that is along the parking path changes to a non-drivable space.

* * * * *